(12) United States Patent
Jhang et al.

(10) Patent No.: US 12,000,994 B2
(45) Date of Patent: Jun. 4, 2024

(54) OPTICAL IMAGING LENS

(71) Applicant: GENIUS ELECTRONIC OPTICAL (XIAMEN) CO., LTD., Fujian (CN)

(72) Inventors: Jia-Sin Jhang, Taichung (TW); Yanxuan Yin, Fujian (CN); Lihua Lei, Fujian (CN)

(73) Assignee: GENIUS ELECTRONIC OPTICAL (XIAMEN) CO., LTD., Fujian (CN)

( * ) Notice: Subject to any disclaimer, the term of this patent is extended or adjusted under 35 U.S.C. 154(b) by 0 days.

(21) Appl. No.: 18/150,200

(22) Filed: Jan. 5, 2023

(65) Prior Publication Data

US 2023/0228978 A1 Jul. 20, 2023

Related U.S. Application Data

(63) Continuation of application No. 17/232,121, filed on Apr. 15, 2021, now Pat. No. 11,579,419, which is a continuation of application No. 16/673,974, filed on Nov. 5, 2019, now Pat. No. 11,009,684, which is a continuation of application No. 15/917,848, filed on Mar. 12, 2018, now Pat. No. 10,509,206.

(30) Foreign Application Priority Data

Dec. 29, 2017 (CN) .......................... 201711482079.6

(51) Int. Cl.
*G02B 13/00* (2006.01)
*G02B 1/04* (2006.01)
*G02B 9/64* (2006.01)

(52) U.S. Cl.
CPC ......... *G02B 13/0045* (2013.01); *G02B 1/041* (2013.01); *G02B 9/64* (2013.01)

(58) Field of Classification Search
CPC ....... G02B 13/0045; G02B 1/041; G02B 9/64
USPC ........................................ 359/708, 750, 754
See application file for complete search history.

(56) References Cited

U.S. PATENT DOCUMENTS

2019/0056568 A1* 2/2019 Huang ..................... G02B 9/64

* cited by examiner

*Primary Examiner* — William Choi
(74) *Attorney, Agent, or Firm* — JCIPRNET

(57) ABSTRACT

An optical imaging lens includes a first, a second, a third, a fourth, a fifth, a sixth, a seventh and an eighth lens elements from an object side to an image side in order along an optical axis. The optical imaging lens satisfies: EFL/(G45+T5) ≤8.500, wherein EFL is an effective focal length of the optical imaging lens, G45 is an air gap from the fourth lens element to the fifth lens element along the optical axis, and T5 is a thickness of the fifth lens element along the optical axis.

20 Claims, 25 Drawing Sheets

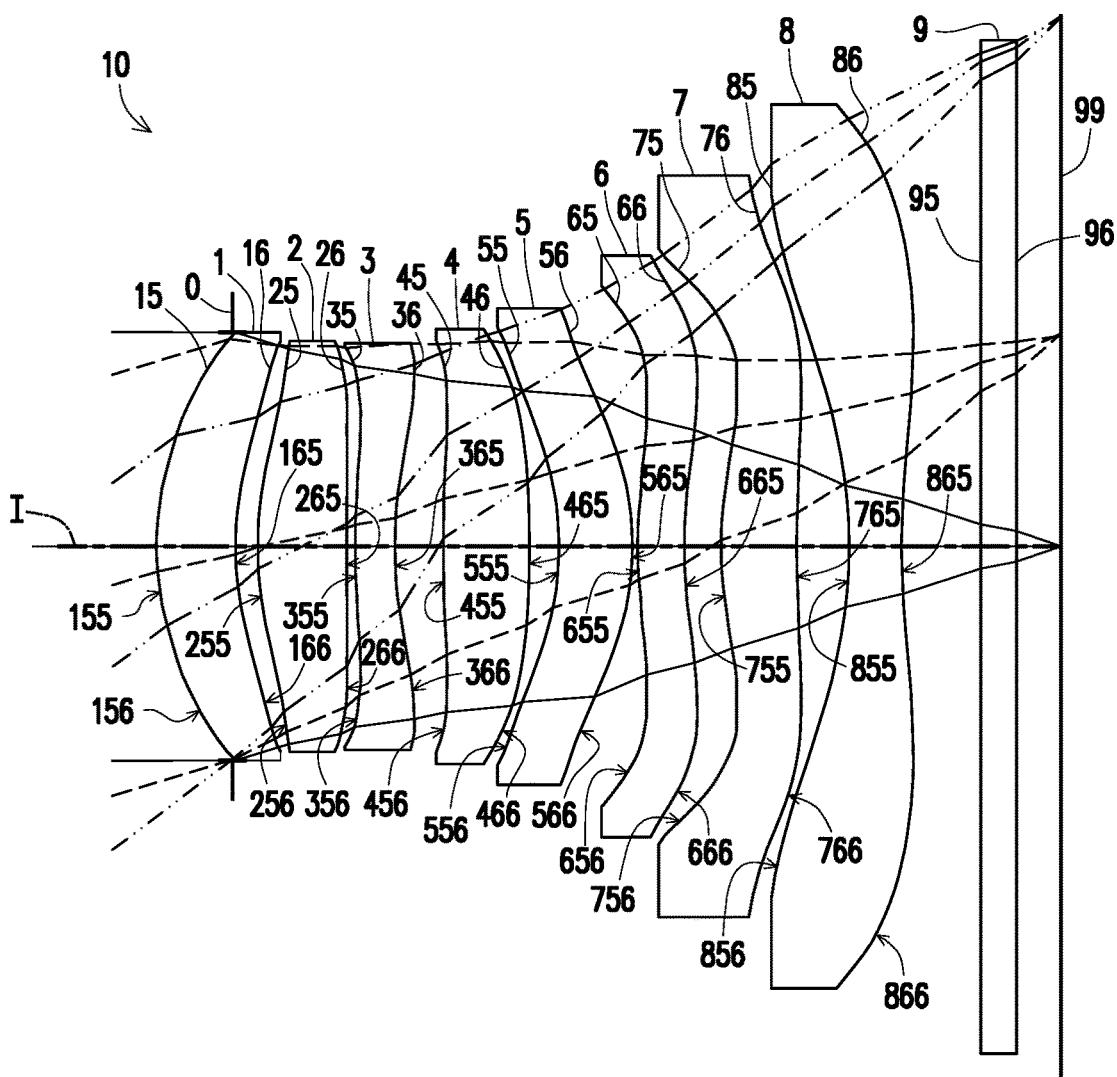
FIG. 6
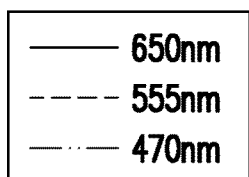
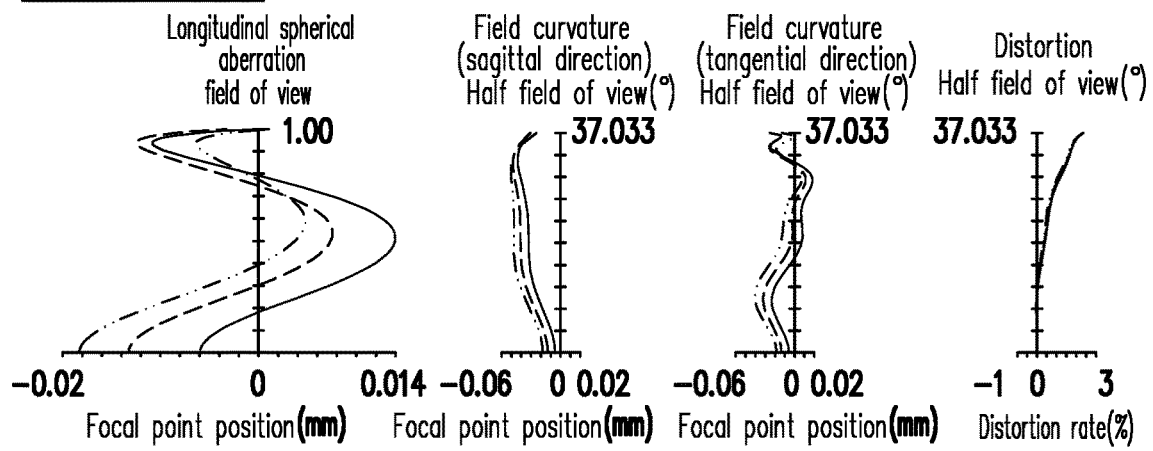
FIG. 7A  FIG. 7B  FIG. 7C  FIG. 7D

| First embodiment |||||||
|---|---|---|---|---|---|---|
| EFL =4.172 mm, HFOV =37.033°, Fno =1.6, TTL =5.502 mm, Image height=3.238 mm |||||||
| lens element | Surface | Radius (mm) | Distance (mm) | Refractive index | Abbe number | Focal length (mm) |
| Object | | Infinite | Infinite | | | |
| Aperture 0 | | Infinite | -0.461 | | | |
| First lens element 1 | Object side Surface 15 | 1.956 | 0.480 | 1.545 | 55.987 | 30.337 |
| | Image side Surface 16 | 2.026 | 0.133 | | | |
| Second lens element 2 | Object side Surface 25 | 2.269 | 0.546 | 1.545 | 55.987 | 4.248 |
| | Image side Surface 26 | 93.927 | 0.045 | | | |
| Third lens element 3 | Object side Surface 35 | 4.304 | 0.240 | 1.661 | 20.412 | -7.170 |
| | Image side Surface 36 | 2.215 | 0.297 | | | |
| Fourth lens element 4 | Object side Surface 45 | 6.556 | 0.530 | 1.545 | 55.987 | 6.412 |
| | Image side Surface 46 | -7.308 | 0.178 | | | |
| Fifth lens element 5 | Object side Surface 55 | -1.699 | 0.444 | 1.545 | 55.987 | 30.879 |
| | Image side Surface 56 | -1.686 | 0.035 | | | |
| Sixth lens element 6 | Object side Surface 65 | 3.665 | 0.280 | 1.661 | 20.412 | -13.292 |
| | Image side Surface 66 | 2.514 | 0.224 | | | |
| Seventh lens element 7 | Object side Surface 75 | 2.238 | 0.466 | 1.545 | 55.987 | 4.992 |
| | Image side Surface 76 | 11.551 | 0.316 | | | |
| Eighth lens element 8 | Object side Surface 85 | -2.926 | 0.320 | 1.545 | 55.987 | -3.347 |
| | Image side Surface 86 | 5.062 | 0.488 | | | |
| Filter 9 | Object side Surface 95 | Infinite | 0.210 | 1.517 | 64.167 | |
| | Image side Surface 96 | Infinite | 0.270 | | | |
| | Image plane 99 | Infinite | 0.000 | | | |

FIG. 8

| Surface | K | $a_4$ | $a_6$ | $a_8$ |
|---|---|---|---|---|
| 15 | 0.000000E+00 | -2.017998E-02 | 4.913018E-03 | -1.936848E-03 |
| 16 | 0.000000E+00 | -7.207851E-02 | -1.865496E-02 | 1.474028E-02 |
| 25 | 0.000000E+00 | -4.178990E-02 | -3.516924E-02 | -8.460082E-03 |
| 26 | 0.000000E+00 | 3.312173E-02 | -9.116298E-02 | 3.445942E-02 |
| 35 | 0.000000E+00 | -1.178336E-01 | 2.098009E-02 | 1.125007E-02 |
| 36 | 0.000000E+00 | -1.660816E-01 | 1.014381E-01 | -6.330118E-02 |
| 45 | 0.000000E+00 | -3.936882E-02 | -9.852936E-03 | -5.080972E-03 |
| 46 | 0.000000E+00 | -4.487793E-02 | -8.852179E-03 | 6.030592E-03 |
| 55 | 0.000000E+00 | 6.363988E-02 | -3.371410E-03 | 4.772512E-02 |
| 56 | 0.000000E+00 | 3.979303E-02 | 2.301484E-02 | 1.470051E-03 |
| 65 | 0.000000E+00 | -8.997457E-02 | -1.190320E-03 | 1.818590E-02 |
| 66 | 0.000000E+00 | -1.701770E-01 | 6.066095E-02 | -1.627274E-02 |
| 75 | 0.000000E+00 | -1.408031E-01 | 6.777643E-03 | 5.867525E-04 |
| 76 | 0.000000E+00 | -1.666011E-03 | -2.145286E-02 | 3.520308E-03 |
| 85 | 0.000000E+00 | 1.563934E-02 | 2.064730E-03 | -3.302866E-04 |
| 86 | 0.000000E+00 | -4.396902E-02 | 5.053868E-03 | 5.419437E-05 |
| Surface | $a_{10}$ | $a_{12}$ | $a_{14}$ | |
| 15 | 5.573677E-03 | -4.463841E-03 | 1.417241E-03 | |
| 16 | -1.881618E-03 | -1.331648E-03 | 1.513902E-03 | |
| 25 | 7.527309E-03 | 6.296519E-03 | -2.635713E-03 | |
| 26 | 6.846193E-03 | -6.175846E-03 | 1.062281E-04 | |
| 35 | -2.504215E-02 | 1.311513E-02 | -3.841757E-03 | |
| 36 | 1.285794E-02 | -8.818388E-04 | -2.253069E-04 | |
| 45 | -6.906276E-03 | 6.345970E-03 | -1.118454E-03 | |
| 46 | -6.191625E-03 | 2.806052E-03 | -1.967782E-04 | |
| 55 | -3.678764E-02 | 1.122553E-02 | -1.593550E-03 | |
| 56 | 3.844740E-03 | -5.232263E-03 | 1.503636E-03 | |
| 65 | -1.817080E-02 | 5.023129E-03 | -2.558272E-04 | |
| 66 | -2.083695E-03 | 1.625749E-03 | -1.559637E-04 | |
| 75 | -1.917603E-03 | 5.612457E-04 | -1.508480E-05 | |
| 76 | 4.379355E-04 | -9.537274E-05 | 1.747811E-06 | |
| 85 | 4.492302E-05 | 7.266659E-07 | -4.080562E-07 | |
| 86 | -6.446006E-05 | -1.952091E-06 | 6.103143E-07 | |

FIG. 9

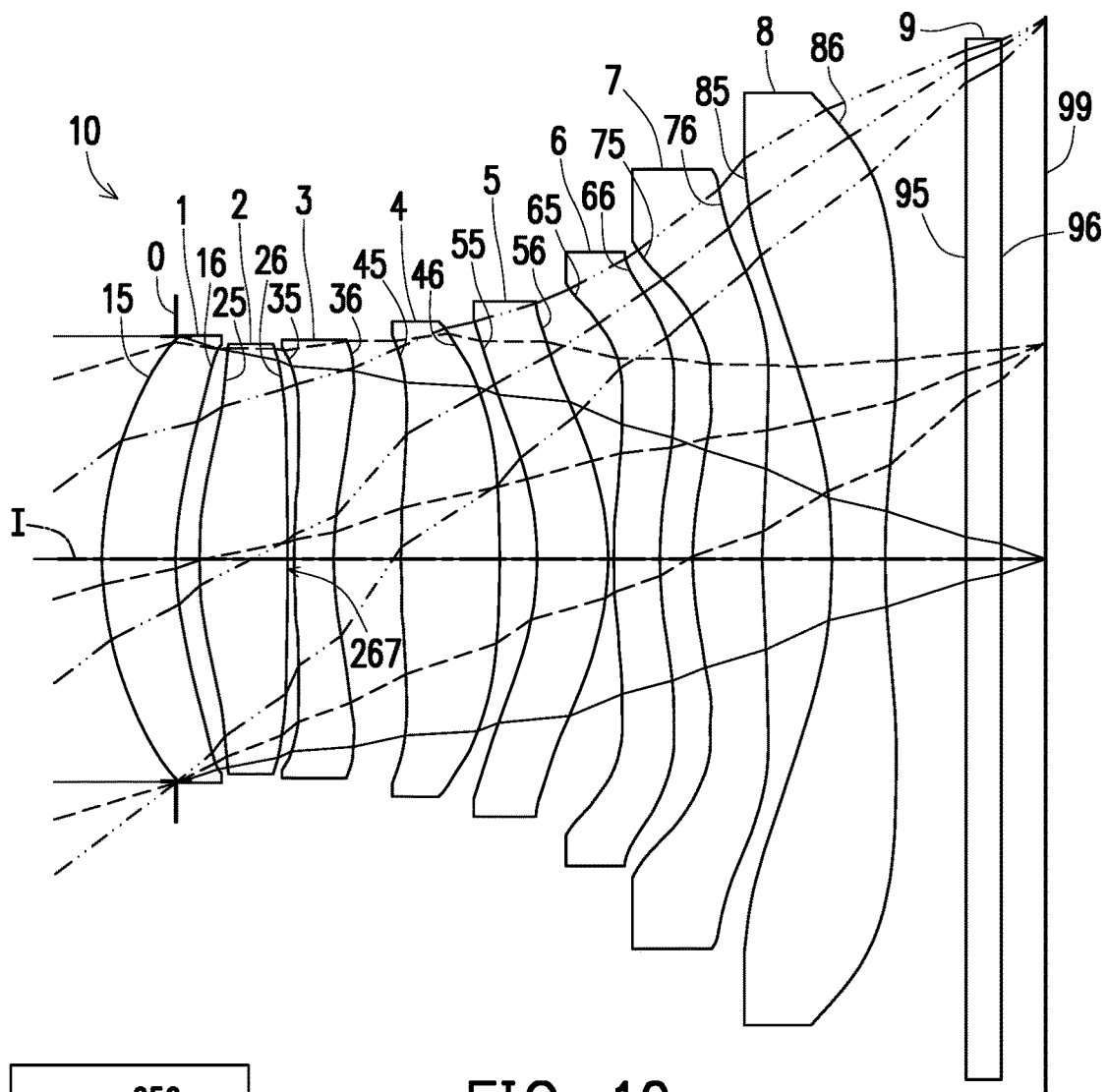
FIG. 10
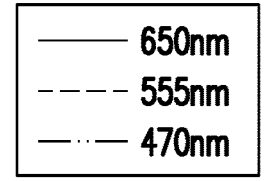
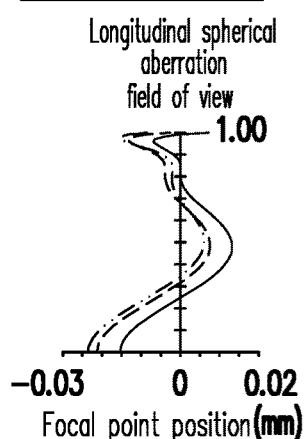
FIG. 11A
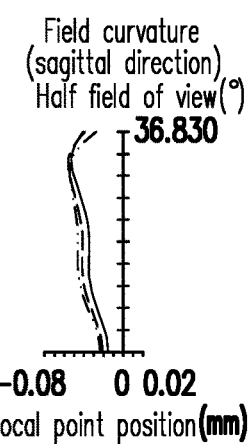
FIG. 11B
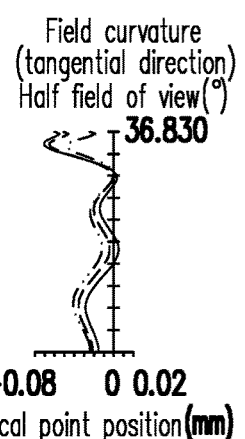
FIG. 11C
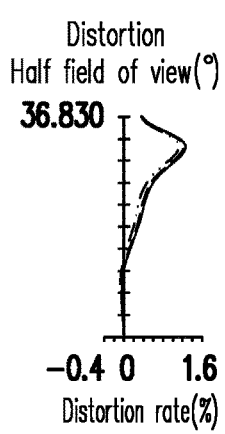
FIG. 11D

| Second embodiment ||||||
|---|---|---|---|---|---|
| EFL =4.275 mm, HFOV =36.830°, Fno =1.6, TTL =5.686 mm, Image height=3.238 mm ||||||
| lens element | Surface | Radius (mm) | Distance (mm) | Refractive index | Abbe number | Focal length (mm) |
| Object | | Infinite | Infinite | | | |
| Aperture 0 | | Infinite | -0.447 | | | |
| First lens element 1 | Object side Surface 15 | 2.129 | 0.443 | 1.545 | 55.987 | 59.000 |
| | Image side Surface 16 | 2.112 | 0.139 | | | |
| Second lens element 2 | Object side Surface 25 | 2.328 | 0.532 | 1.545 | 55.987 | 4.201 |
| | Image side Surface 26 | -149.490 | 0.042 | | | |
| Third lens element 3 | Object side Surface 35 | 4.444 | 0.240 | 1.661 | 20.412 | -7.329 |
| | Image side Surface 36 | 2.278 | 0.407 | | | |
| Fourth lens element 4 | Object side Surface 45 | 6.343 | 0.594 | 1.545 | 55.987 | 6.228 |
| | Image side Surface 46 | -7.095 | 0.224 | | | |
| Fifth lens element 5 | Object side Surface 55 | -1.722 | 0.426 | 1.545 | 55.987 | 31.557 |
| | Image side Surface 56 | -1.703 | 0.035 | | | |
| Sixth lens element 6 | Object side Surface 65 | 3.612 | 0.280 | 1.661 | 20.412 | -12.475 |
| | Image side Surface 66 | 2.441 | 0.197 | | | |
| Seventh lens element 7 | Object side Surface 75 | 2.191 | 0.422 | 1.545 | 55.987 | 5.171 |
| | Image side Surface 76 | 9.110 | 0.418 | | | |
| Eighth lens element 8 | Object side Surface 85 | -2.901 | 0.320 | 1.545 | 55.987 | -3.393 |
| | Image side Surface 86 | 5.334 | 0.488 | | | |
| Filter 9 | Object side Surface 95 | Infinite | 0.210 | 1.517 | 64.167 | |
| | Image side Surface 96 | Infinite | 0.270 | | | |
| | Image plane 99 | Infinite | 0.000 | | | |

FIG. 12

| Surface | K | $a_4$ | $a_6$ | $a_8$ |
|---|---|---|---|---|
| 15 | 0.000000E+00 | -1.975363E-02 | 5.768920E-03 | -1.843770E-03 |
| 16 | 0.000000E+00 | -7.082588E-02 | -1.794907E-02 | 1.524894E-02 |
| 25 | 0.000000E+00 | -4.213394E-02 | -3.569682E-02 | -8.859681E-03 |
| 26 | 0.000000E+00 | 3.634119E-02 | -9.035417E-02 | 3.480351E-02 |
| 35 | 0.000000E+00 | -1.165495E-01 | 2.394526E-02 | 1.272225E-02 |
| 36 | 0.000000E+00 | -1.672019E-01 | 1.002586E-01 | -6.213167E-02 |
| 45 | 0.000000E+00 | -3.616899E-02 | -8.033687E-03 | -5.174916E-03 |
| 46 | 0.000000E+00 | -4.682834E-02 | -9.905299E-03 | 6.193744E-03 |
| 55 | 0.000000E+00 | 6.242321E-02 | -3.909779E-03 | 4.742251E-02 |
| 56 | 0.000000E+00 | 4.289447E-02 | 2.295533E-02 | 1.504958E-03 |
| 65 | 0.000000E+00 | -9.016046E-02 | -9.564757E-04 | 1.767888E-02 |
| 66 | 0.000000E+00 | -1.715068E-01 | 6.007891E-02 | -1.631593E-02 |
| 75 | 0.000000E+00 | -1.381272E-01 | 8.575781E-03 | 7.241661E-04 |
| 76 | 0.000000E+00 | -1.637561E-03 | -2.166351E-02 | 3.491711E-03 |
| 85 | 0.000000E+00 | 1.454503E-02 | 2.000564E-03 | -3.332559E-04 |
| 86 | 0.000000E+00 | -4.072695E-02 | 4.947406E-03 | 5.484087E-05 |
| Surface | $a_{10}$ | $a_{12}$ | $a_{14}$ | |
| 15 | 5.539423E-03 | -4.458870E-03 | 1.452103E-03 | |
| 16 | -1.757982E-03 | -1.408493E-03 | 1.392632E-03 | |
| 25 | 7.430119E-03 | 6.329244E-03 | -2.579654E-03 | |
| 26 | 7.100429E-03 | -5.966824E-03 | 2.123577E-04 | |
| 35 | -2.469984E-02 | 1.308814E-02 | -3.804109E-03 | |
| 36 | 1.412482E-02 | -3.740642E-04 | -3.128497E-04 | |
| 45 | -7.188582E-03 | 6.326796E-03 | -9.386616E-04 | |
| 46 | -6.049788E-03 | 2.784809E-03 | -2.809119E-04 | |
| 55 | -3.667497E-02 | 1.149337E-02 | -1.350917E-03 | |
| 56 | 3.815656E-03 | -5.303834E-03 | 1.442470E-03 | |
| 65 | -1.831297E-02 | 5.017556E-03 | -2.446364E-04 | |
| 66 | -2.091377E-03 | 1.624135E-03 | -1.551445E-04 | |
| 75 | -1.948466E-03 | 5.401183E-04 | -2.383647E-05 | |
| 76 | 4.354651E-04 | -9.530233E-05 | 1.866634E-06 | |
| 85 | 4.518580E-05 | 8.853840E-07 | -3.584928E-07 | |
| 86 | -6.402082E-05 | -2.059678E-06 | 5.652749E-07 | |

FIG. 13

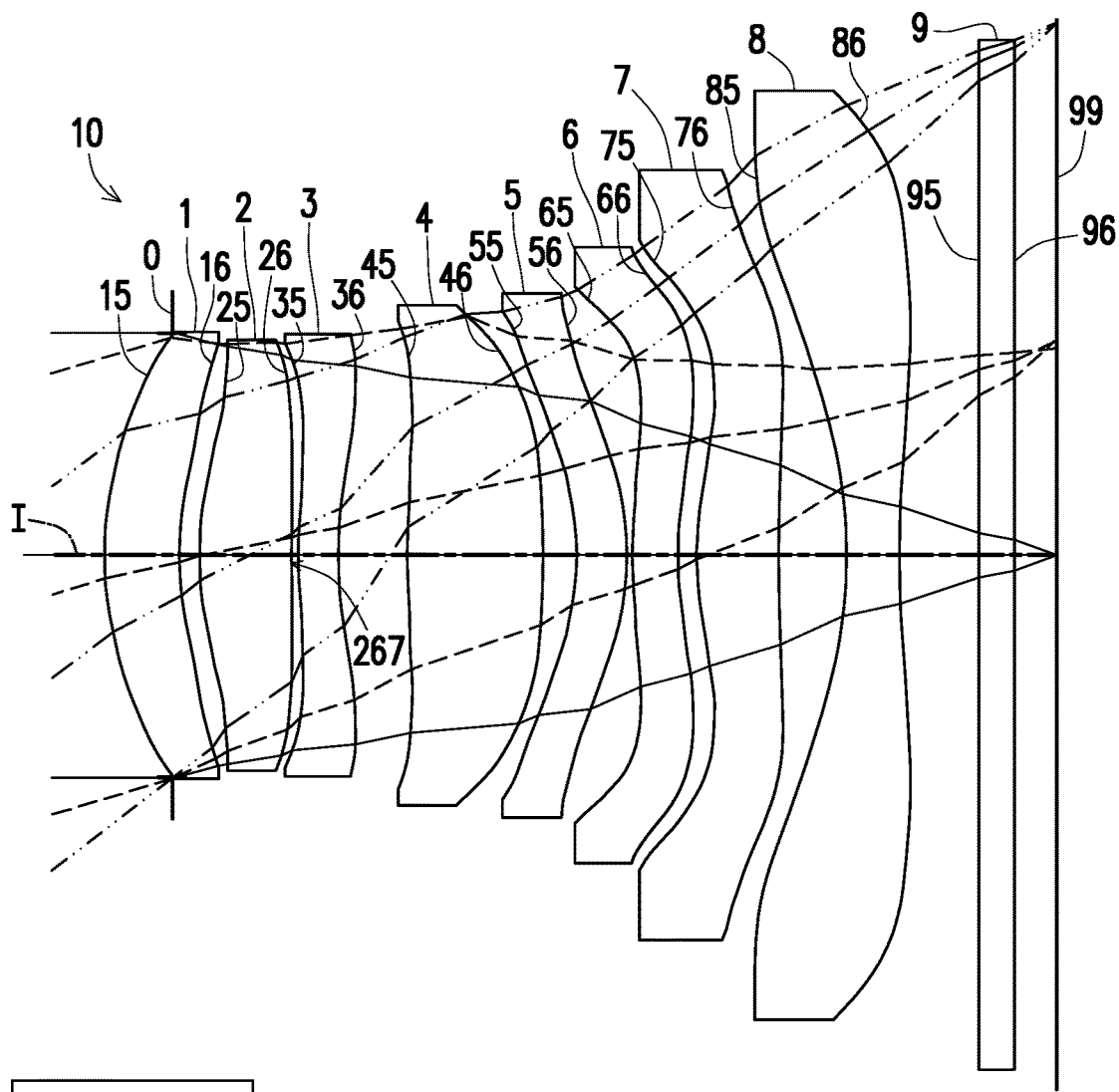
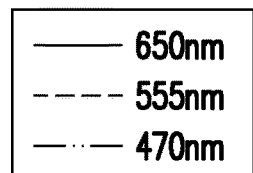
FIG. 14
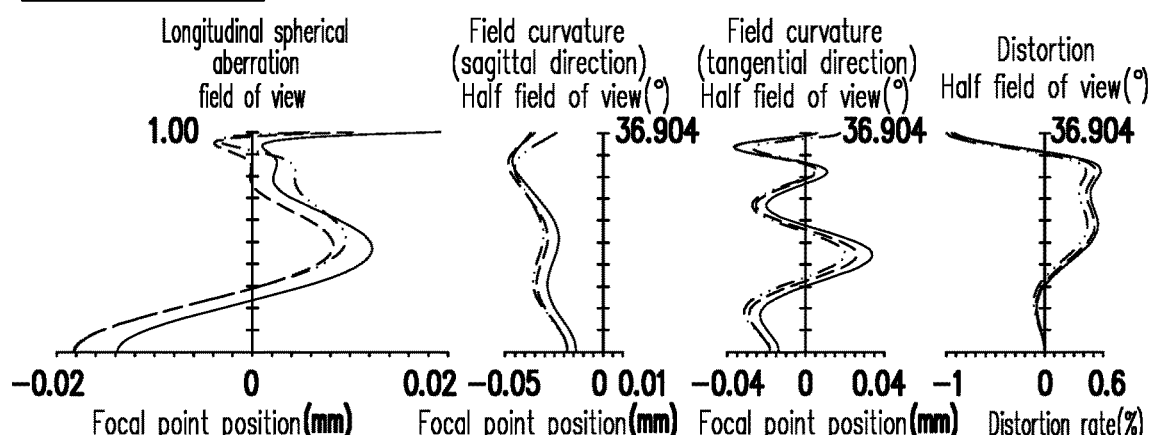
FIG. 15A    FIG. 15B    FIG. 15C    FIG. 15D

| Third embodiment |||||||
|---|---|---|---|---|---|---|
| EFL =4.325 mm, HFOV =36.904°, Fno =1.6, TTL =5.816 mm, Image height=3.238 mm |||||||
| lens element | Surface || Radius (mm) | Distance (mm) | Refractive index | Abbe number | Focal length (mm) |
| Object | | | Infinite | Infinite | | | |
| Aperture 0 | | | Infinite | -0.412 | | | |
| First lens element 1 | Object side Surface | 15 | 2.310 | 0.458 | 1.545 | 55.987 | 98.331 |
| | Image side Surface | 16 | 2.245 | 0.122 | | | |
| Second lens element 2 | Object side Surface | 25 | 2.318 | 0.563 | 1.545 | 55.987 | 4.077 |
| | Image side Surface | 26 | -51.780 | 0.043 | | | |
| Third lens element 3 | Object side Surface | 35 | 5.150 | 0.240 | 1.661 | 20.412 | -7.454 |
| | Image side Surface | 36 | 2.483 | 0.423 | | | |
| Fourth lens element 4 | Object side Surface | 45 | 8.075 | 0.828 | 1.545 | 55.987 | 6.415 |
| | Image side Surface | 46 | -5.966 | 0.203 | | | |
| Fifth lens element 5 | Object side Surface | 55 | -1.707 | 0.307 | 1.545 | 55.987 | 44.735 |
| | Image side Surface | 56 | -1.697 | 0.035 | | | |
| Sixth lens element 6 | Object side Surface | 65 | 3.800 | 0.280 | 1.661 | 20.412 | -11.063 |
| | Image side Surface | 66 | 2.435 | 0.113 | | | |
| Seventh lens element 7 | Object side Surface | 75 | 2.231 | 0.498 | 1.545 | 55.987 | 5.023 |
| | Image side Surface | 76 | 10.977 | 0.416 | | | |
| Eighth lens element 8 | Object side Surface | 85 | -2.876 | 0.320 | 1.545 | 55.987 | -3.467 |
| | Image side Surface | 86 | 5.764 | 0.488 | | | |
| Filter 9 | Object side Surface | 95 | Infinite | 0.210 | 1.517 | 64.167 | |
| | Image side Surface | 96 | Infinite | 0.270 | | | |
| | Image plane | 99 | Infinite | 0.000 | | | |

FIG. 16

| Surface | K | $a_4$ | $a_6$ | $a_8$ |
|---|---|---|---|---|
| 15 | 0.000000E+00 | -1.876824E-02 | 6.201099E-03 | -1.961251E-03 |
| 16 | 0.000000E+00 | -7.212682E-02 | -1.819519E-02 | 1.552400E-02 |
| 25 | 0.000000E+00 | -4.206287E-02 | -3.615446E-02 | -9.207768E-03 |
| 26 | 0.000000E+00 | 3.776435E-02 | -9.058564E-02 | 3.422111E-02 |
| 35 | 0.000000E+00 | -1.185977E-01 | 2.427539E-02 | 1.366472E-02 |
| 36 | 0.000000E+00 | -1.660953E-01 | 1.005371E-01 | -6.108250E-02 |
| 45 | 0.000000E+00 | -2.801030E-02 | -3.487107E-03 | -4.131740E-03 |
| 46 | 0.000000E+00 | -5.279074E-02 | -8.711102E-03 | 6.861752E-03 |
| 55 | 0.000000E+00 | 6.375910E-02 | -6.682150E-03 | 4.668130E-02 |
| 56 | 0.000000E+00 | 4.960299E-02 | 2.576725E-02 | 1.736825E-03 |
| 65 | 0.000000E+00 | -9.128750E-02 | -1.711907E-05 | 1.661017E-02 |
| 66 | 0.000000E+00 | -1.688631E-01 | 5.927637E-02 | -1.635890E-02 |
| 75 | 0.000000E+00 | -1.429062E-01 | 1.175021E-02 | 9.233740E-04 |
| 76 | 0.000000E+00 | 8.688386E-05 | -2.192901E-02 | 3.459585E-03 |
| 85 | 0.000000E+00 | 1.343680E-02 | 2.036283E-03 | -3.246081E-04 |
| 86 | 0.000000E+00 | -3.667427E-02 | 4.682740E-03 | 5.571021E-05 |
| Surface | $a_{10}$ | $a_{12}$ | $a_{14}$ | |
| 15 | 5.422777E-03 | -4.520088E-03 | 1.413386E-03 | |
| 16 | -1.644213E-03 | -1.469364E-03 | 1.277633E-03 | |
| 25 | 7.303695E-03 | 6.276619E-03 | -2.628658E-03 | |
| 26 | 6.807374E-03 | -5.944348E-03 | 3.707866E-04 | |
| 35 | -2.394320E-02 | 1.353200E-02 | -3.550749E-03 | |
| 36 | 1.501036E-02 | 3.444025E-05 | -2.366936E-04 | |
| 45 | -7.158619E-03 | 6.192587E-03 | -1.084330E-03 | |
| 46 | -6.171789E-03 | 2.566682E-03 | -3.835282E-04 | |
| 55 | -3.657328E-02 | 1.157426E-02 | -1.400038E-03 | |
| 56 | 3.619943E-03 | -5.402566E-03 | 1.427775E-03 | |
| 65 | -1.864506E-02 | 5.004121E-03 | -2.127827E-04 | |
| 66 | -2.123520E-03 | 1.608105E-03 | -1.590513E-04 | |
| 75 | -1.964328E-03 | 5.301901E-04 | -2.861106E-05 | |
| 76 | 4.324237E-04 | -9.504112E-05 | 2.148147E-06 | |
| 85 | 4.630737E-05 | 9.712779E-07 | -3.622280E-07 | |
| 86 | -6.288120E-05 | -2.009017E-06 | 5.513468E-07 | |

FIG. 17

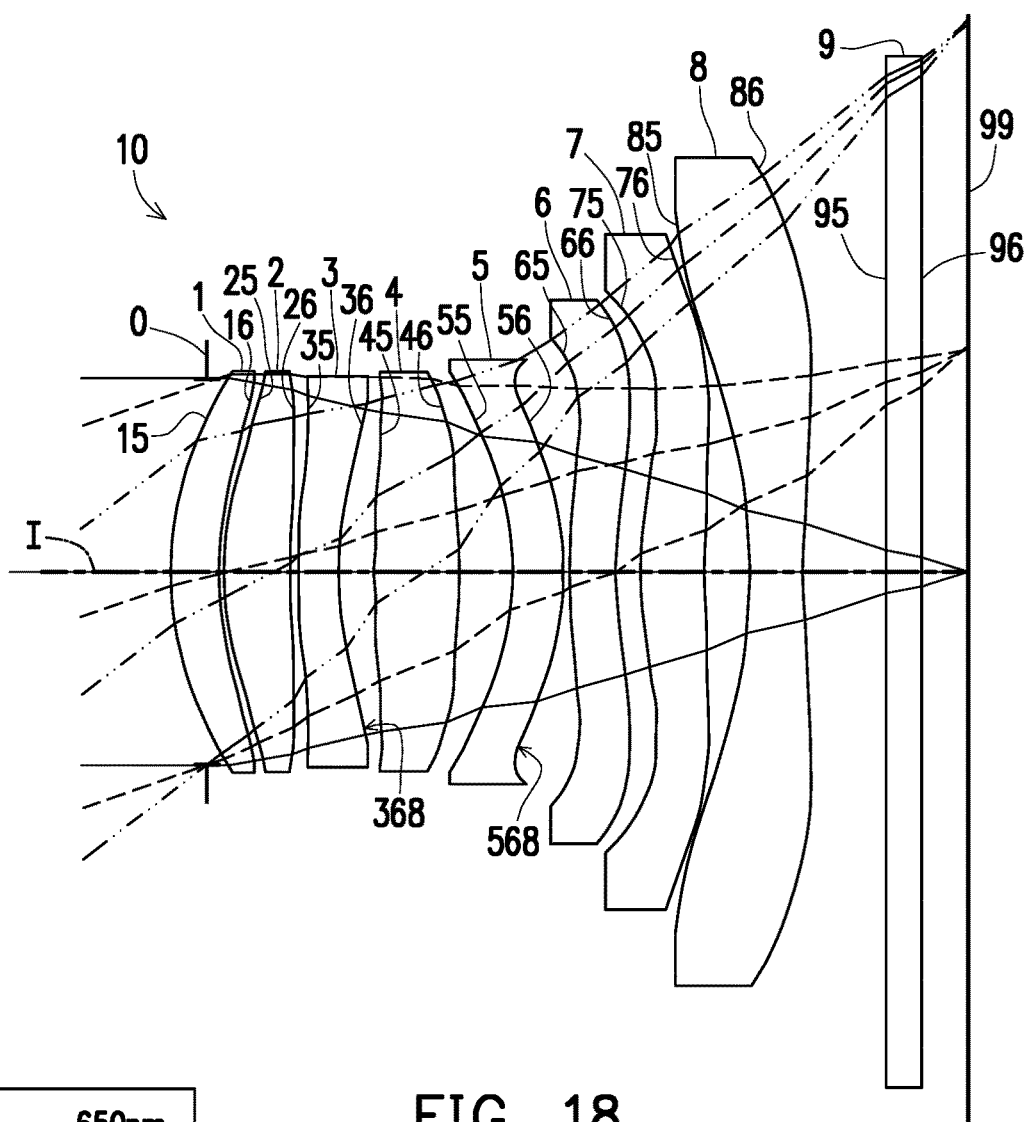
FIG. 18
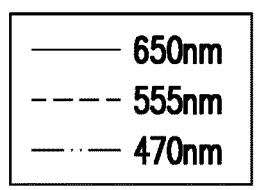
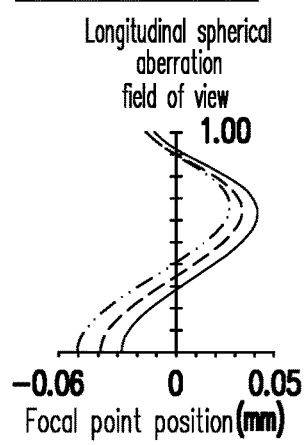
FIG. 19A
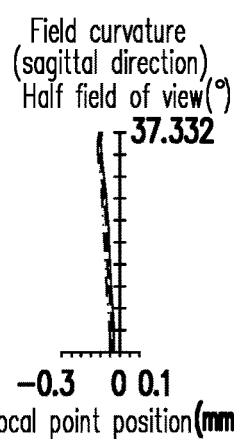
FIG. 19B
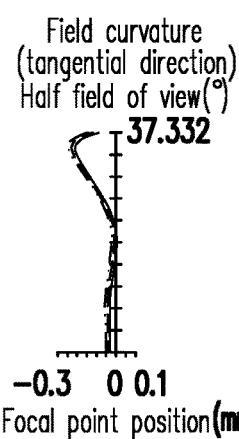
FIG. 19C
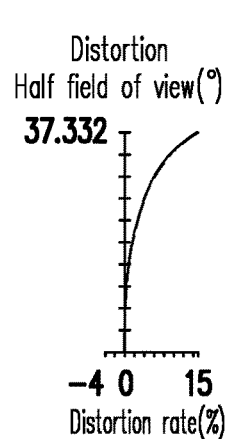
FIG. 19D

| Fourth embodiment ||||||
| :---: | :---: | :---: | :---: | :---: | :---: | :---: |
| EFL =3.639 mm, HFOV =37.332°, Fno =1.6, TTL =4.695 mm, Image height=3.238 mm ||||||
| lens element | Surface | Radius (mm) | Distance (mm) | Refractive index | Abbe number | Focal length (mm) |
| Object | | Infinite | Infinite | | | |
| Aperture 0 | | Infinite | -0.215 | | | |
| First lens element 1 | Object side Surface 15 | 1.950 | 0.282 | 1.545 | 55.987 | 47.878 |
| | Image side Surface 16 | 2.000 | 0.029 | | | |
| Second lens element 2 | Object side Surface 25 | 1.934 | 0.400 | 1.545 | 55.987 | 3.856 |
| | Image side Surface 26 | 21.860 | 0.035 | | | |
| Third lens element 3 | Object side Surface 35 | 3.011 | 0.240 | 1.661 | 20.412 | -8.135 |
| | Image side Surface 36 | 1.875 | 0.212 | | | |
| Fourth lens element 4 | Object side Surface 45 | 6.192 | 0.495 | 1.545 | 55.987 | 7.575 |
| | Image side Surface 46 | -12.121 | 0.316 | | | |
| Fifth lens element 5 | Object side Surface 55 | -1.619 | 0.301 | 1.545 | 55.987 | 49.414 |
| | Image side Surface 56 | -1.628 | 0.035 | | | |
| Sixth lens element 6 | Object side Surface 65 | 3.380 | 0.280 | 1.661 | 20.412 | -18.068 |
| | Image side Surface 66 | 2.552 | 0.142 | | | |
| Seventh lens element 7 | Object side Surface 75 | 2.249 | 0.383 | 1.545 | 55.987 | 4.794 |
| | Image side Surface 76 | 14.984 | 0.257 | | | |
| Eighth lens element 8 | Object side Surface 85 | -3.075 | 0.320 | 1.545 | 55.987 | -3.731 |
| | Image side Surface 86 | 6.265 | 0.488 | | | |
| Filter 9 | Object side Surface 95 | Infinite | 0.210 | 1.517 | 64.167 | |
| | Image side Surface 96 | Infinite | 0.270 | | | |
| | Image plane 99 | Infinite | 0.000 | | | |

FIG. 20

| Surface | K | $a_4$ | $a_6$ | $a_8$ |
|---|---|---|---|---|
| 15 | 0.000000E+00 | -1.852060E-02 | 5.742892E-03 | -2.766109E-03 |
| 16 | 0.000000E+00 | -7.841271E-02 | -2.108109E-02 | 1.476935E-02 |
| 25 | 0.000000E+00 | -3.984071E-02 | -3.580859E-02 | -9.558951E-03 |
| 26 | 0.000000E+00 | 4.193157E-02 | -8.877144E-02 | 3.383189E-02 |
| 35 | 0.000000E+00 | -1.244758E-01 | 2.268269E-02 | 1.423871E-02 |
| 36 | 0.000000E+00 | -1.636014E-01 | 9.730679E-02 | -6.428518E-02 |
| 45 | 0.000000E+00 | -3.442352E-02 | 9.886831E-05 | -1.127590E-03 |
| 46 | 0.000000E+00 | -5.246213E-02 | -1.248478E-02 | 4.717590E-03 |
| 55 | 0.000000E+00 | 6.783030E-02 | -6.007470E-03 | 4.619401E-02 |
| 56 | 0.000000E+00 | 6.142571E-02 | 3.422121E-02 | 4.564600E-03 |
| 65 | 0.000000E+00 | -9.822256E-02 | -1.541169E-03 | 1.610280E-02 |
| 66 | 0.000000E+00 | -1.658460E-01 | 5.921623E-02 | -1.620754E-02 |
| 75 | 0.000000E+00 | -1.485202E-01 | 1.122038E-02 | 7.822226E-04 |
| 76 | 0.000000E+00 | 1.470351E-03 | -2.176250E-02 | 3.507888E-03 |
| 85 | 0.000000E+00 | 1.381476E-02 | 2.079548E-03 | -3.202856E-04 |
| 86 | 0.000000E+00 | -4.239928E-02 | 4.536574E-03 | 7.666756E-05 |
| Surface | $a_{10}$ | $a_{12}$ | $a_{14}$ | |
| 15 | 4.701151E-03 | -5.037856E-03 | 1.072541E-03 | |
| 16 | -1.783818E-03 | -1.474119E-03 | 1.372175E-03 | |
| 25 | 7.132888E-03 | 6.231241E-03 | -2.785610E-03 | |
| 26 | 5.690393E-03 | -6.619110E-03 | 5.445203E-04 | |
| 35 | -2.301278E-02 | 1.391979E-02 | -3.838372E-03 | |
| 36 | 1.314676E-02 | -8.279254E-04 | -6.631596E-04 | |
| 45 | -6.169460E-03 | 5.868639E-03 | -1.917244E-03 | |
| 46 | -6.794832E-03 | 2.808611E-03 | 2.243430E-04 | |
| 55 | -3.770208E-02 | 1.006291E-02 | -3.013315E-03 | |
| 56 | 4.529906E-03 | -4.959772E-03 | 1.719967E-03 | |
| 65 | -1.887066E-02 | 4.902616E-03 | -2.552899E-04 | |
| 66 | -2.058017E-03 | 1.615733E-03 | -1.657505E-04 | |
| 75 | -1.984595E-03 | 5.352161E-04 | -2.320743E-05 | |
| 76 | 4.413646E-04 | -9.421178E-05 | 2.006550E-06 | |
| 85 | 4.724420E-05 | 1.126651E-06 | -3.918660E-07 | |
| 86 | -5.893586E-05 | -1.590564E-06 | 5.760816E-07 | |

FIG. 21

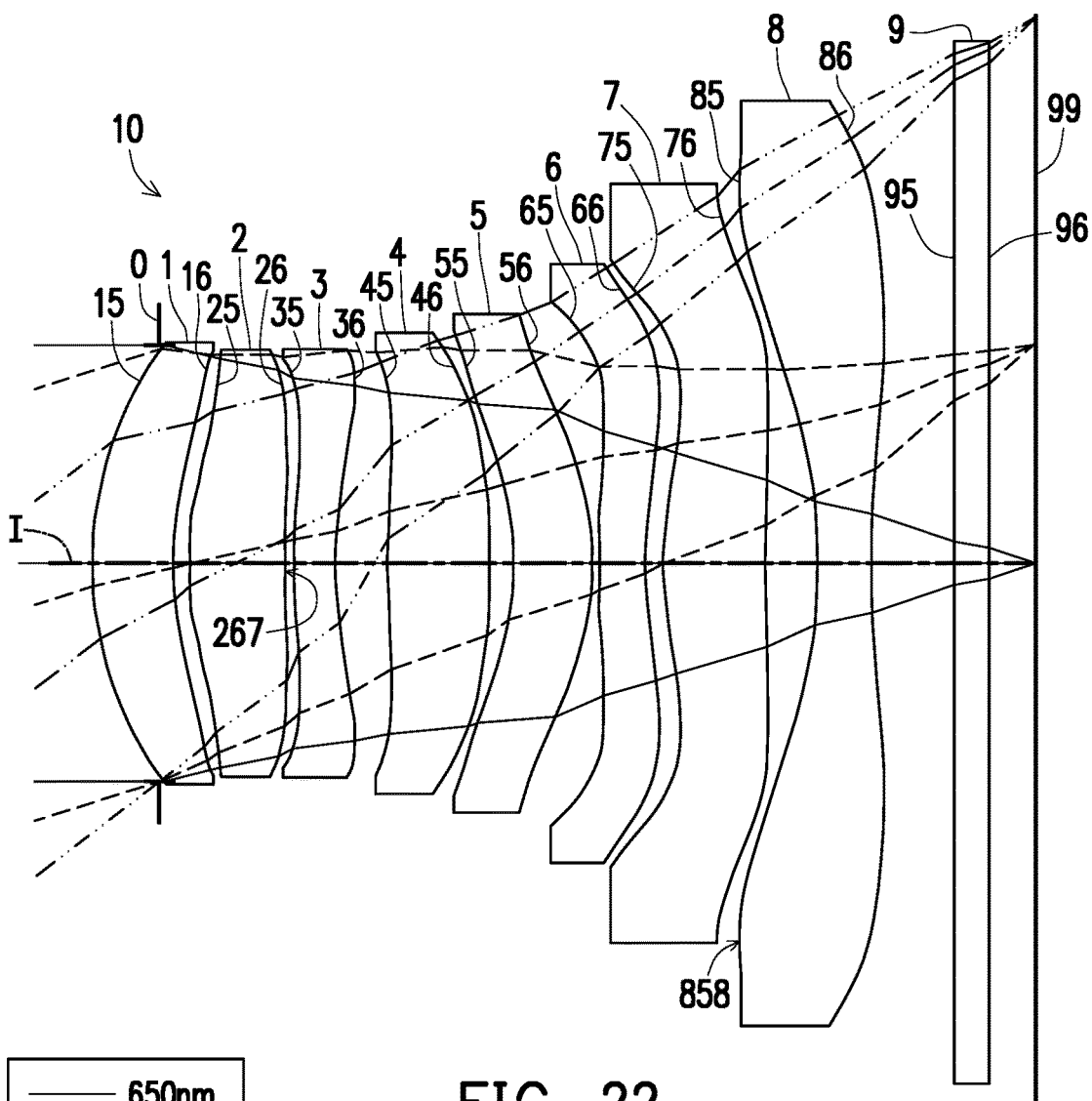
FIG. 22
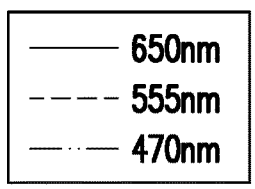
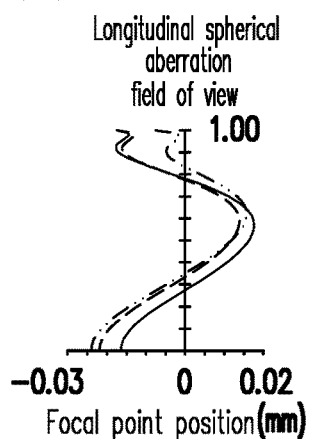
FIG. 23A
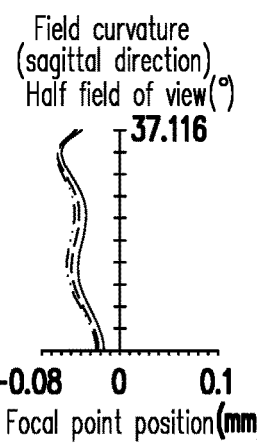
FIG. 23B
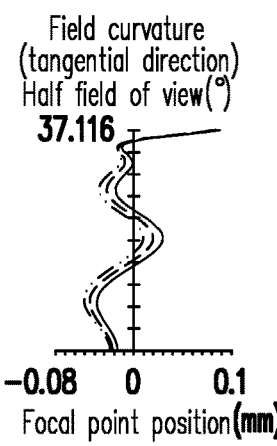
FIG. 23C
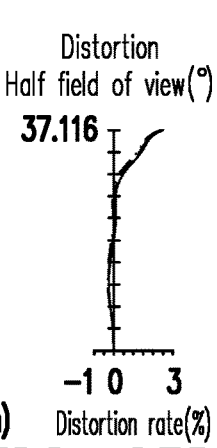
FIG. 23D

| Fifth embodiment ||||||
|---|---|---|---|---|---|
| EFL =4.144 mm, HFOV =37.116°, Fno =1.6, TTL =5.577 mm, Image height=3.238 mm ||||||
| lens element | Surface | Radius (mm) | Distance (mm) | Refractive index | Abbe number | Focal length (mm) |
| Object | | Infinite | Infinite | | | |
| Aperture 0 | | Infinite | -0.402 | | | |
| First lens element 1 | Object side Surface 15 | 2.087 | 0.479 | 1.545 | 55.987 | 32.858 |
| | Image side Surface 16 | 2.170 | 0.095 | | | |
| Second lens element 2 | Object side Surface 25 | 2.294 | 0.575 | 1.545 | 55.987 | 4.191 |
| | Image side Surface 26 | -1079.608 | 0.048 | | | |
| Third lens element 3 | Object side Surface 35 | 4.408 | 0.240 | 1.661 | 20.412 | -7.438 |
| | Image side Surface 36 | 2.283 | 0.314 | | | |
| Fourth lens element 4 | Object side Surface 45 | 8.009 | 0.595 | 1.545 | 55.987 | 6.395 |
| | Image side Surface 46 | -6.033 | 0.147 | | | |
| Fifth lens element 5 | Object side Surface 55 | -1.721 | 0.462 | 1.545 | 55.987 | 29.095 |
| | Image side Surface 56 | -1.700 | 0.035 | | | |
| Sixth lens element 6 | Object side Surface 65 | 4.260 | 0.280 | 1.661 | 20.412 | -9.834 |
| | Image side Surface 66 | 2.515 | 0.110 | | | |
| Seventh lens element 7 | Object side Surface 75 | 2.217 | 0.603 | 1.545 | 55.987 | 4.725 |
| | Image side Surface 76 | 14.226 | 0.306 | | | |
| Eighth lens element 8 | Object side Surface 85 | -2.930 | 0.320 | 1.545 | 55.987 | -3.438 |
| | Image side Surface 86 | 5.434 | 0.488 | | | |
| Filter 9 | Object side Surface 95 | Infinite | 0.210 | 1.517 | 64.167 | |
| | Image side Surface 96 | Infinite | 0.270 | | | |
| | Image plane 99 | Infinite | 0.000 | | | |

FIG. 24

| Surface | K | $a_4$ | $a_6$ | $a_8$ |
|---|---|---|---|---|
| 15 | 0.000000E+00 | -1.852043E-02 | 5.859694E-03 | -1.894145E-03 |
| 16 | 0.000000E+00 | -7.283743E-02 | -1.950076E-02 | 1.452955E-02 |
| 25 | 0.000000E+00 | -4.250422E-02 | -3.504005E-02 | -8.226228E-03 |
| 26 | 0.000000E+00 | 3.536780E-02 | -9.067853E-02 | 3.405788E-02 |
| 35 | 0.000000E+00 | -1.198852E-01 | 2.005254E-02 | 1.102402E-02 |
| 36 | 0.000000E+00 | -1.648351E-01 | 1.017295E-01 | -6.337779E-02 |
| 45 | 0.000000E+00 | -4.040766E-02 | -1.069482E-02 | -5.461552E-03 |
| 46 | 0.000000E+00 | -5.081968E-02 | -8.381667E-03 | 6.851260E-03 |
| 55 | 0.000000E+00 | 6.812248E-02 | -3.791306E-03 | 4.735069E-02 |
| 56 | 0.000000E+00 | 3.849103E-02 | 2.357622E-02 | 1.902344E-03 |
| 65 | 0.000000E+00 | -9.035724E-02 | -1.079130E-03 | 1.798500E-02 |
| 66 | 0.000000E+00 | -1.717104E-01 | 5.968812E-02 | -1.628782E-02 |
| 75 | 0.000000E+00 | -1.452274E-01 | 8.025451E-03 | 8.077970E-04 |
| 76 | 0.000000E+00 | -7.324777E-04 | -2.146058E-02 | 3.514522E-03 |
| 85 | 0.000000E+00 | 1.546309E-02 | 2.079226E-03 | -3.256082E-04 |
| 86 | 0.000000E+00 | -3.946577E-02 | 5.125985E-03 | 4.967735E-05 |
| Surface | $a_{10}$ | $a_{12}$ | $a_{14}$ | |
| 15 | 5.427144E-03 | -4.563463E-03 | 1.380058E-03 | |
| 16 | -1.805633E-03 | -1.207946E-03 | 1.604425E-03 | |
| 25 | 7.705840E-03 | 6.398271E-03 | -2.591179E-03 | |
| 26 | 6.380236E-03 | -6.430260E-03 | 3.246570E-05 | |
| 35 | -2.508661E-02 | 1.304384E-02 | -3.943976E-03 | |
| 36 | 1.270600E-02 | -9.729544E-04 | -2.217750E-04 | |
| 45 | -6.947295E-03 | 6.353400E-03 | -1.202328E-03 | |
| 46 | -5.976365E-03 | 2.817557E-03 | -1.732266E-04 | |
| 55 | -3.665304E-02 | 1.142471E-02 | -1.493743E-03 | |
| 56 | 3.884717E-03 | -5.301636E-03 | 1.451892E-03 | |
| 65 | -1.825718E-02 | 5.001433E-03 | -2.598606E-04 | |
| 66 | -2.076207E-03 | 1.624403E-03 | -1.564304E-04 | |
| 75 | -1.881536E-03 | 5.663456E-04 | -1.618098E-05 | |
| 76 | 4.381153E-04 | -9.483911E-05 | 1.989226E-06 | |
| 85 | 4.576595E-05 | 8.528025E-07 | -3.921067E-07 | |
| 86 | -6.507048E-05 | -1.996839E-06 | 6.084338E-07 | |

FIG. 25

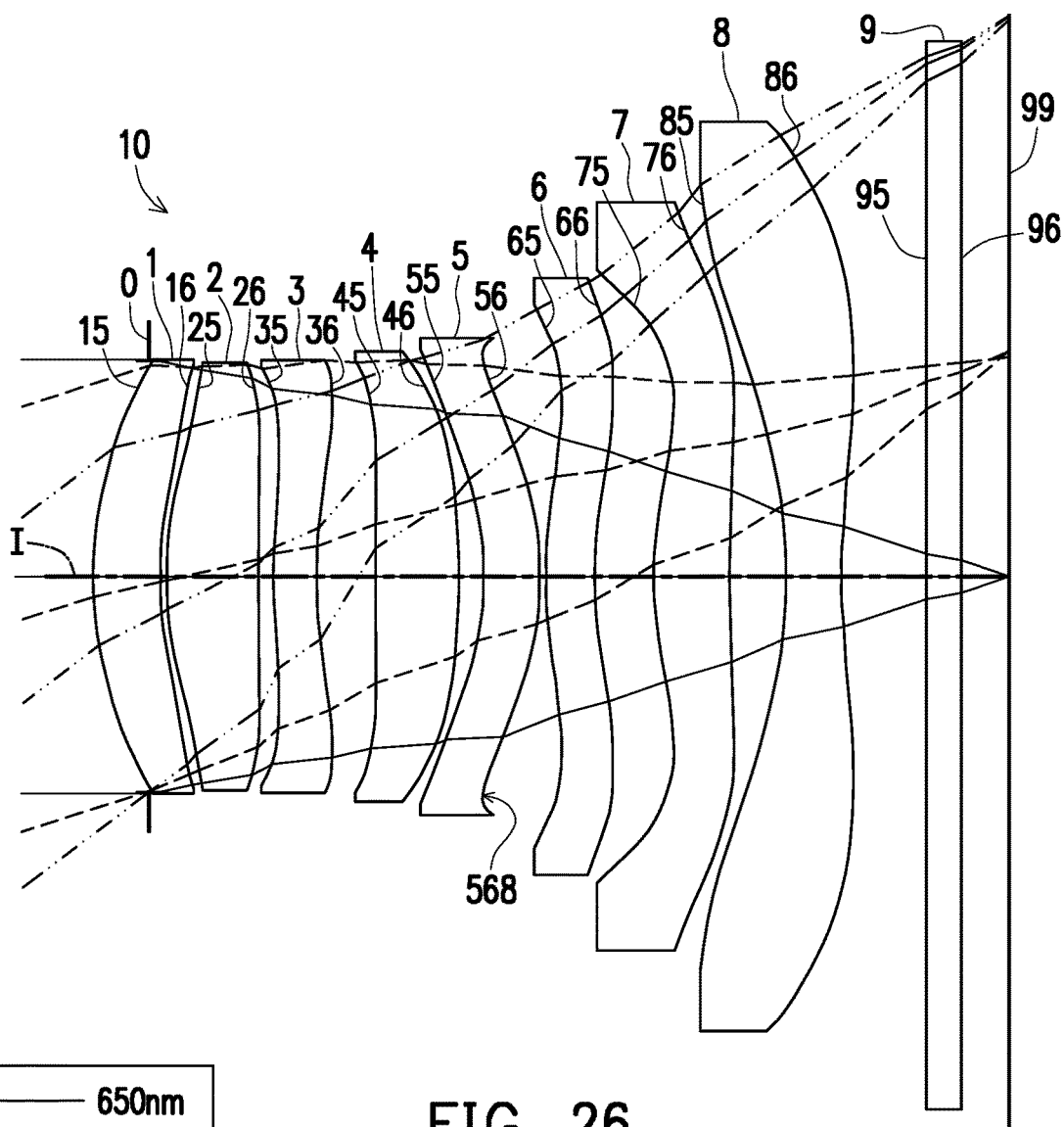
FIG. 26
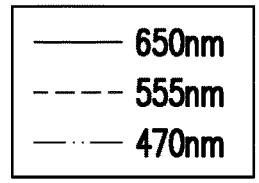
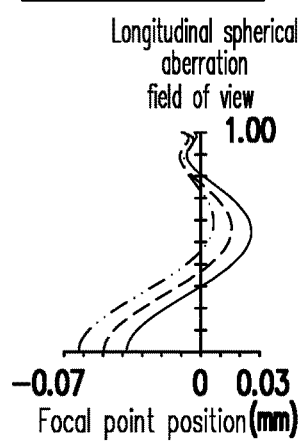
FIG. 27A
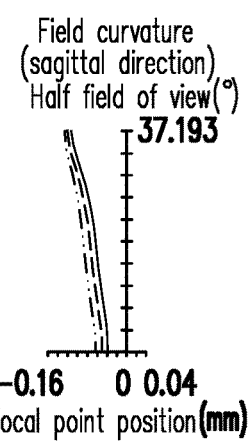
FIG. 27B
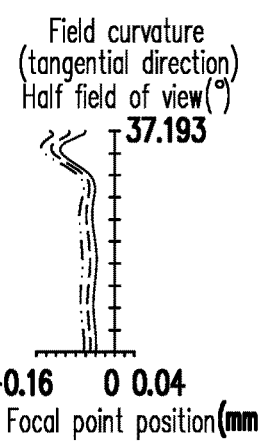
FIG. 27C
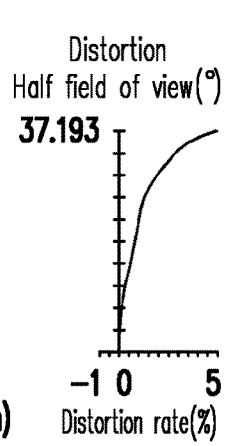
FIG. 27D

| Sixth embodiment ||||||
| --- | --- | --- | --- | --- | --- | --- |
| EFL =3.989 mm, HFOV =37.193°, Fno =1.6, TTL =5.281 mm, Image height=3.238 mm ||||||
| lens element | Surface | Radius (mm) | Distance (mm) | Refractive index | Abbe number | Focal length (mm) |
| Object | | Infinite | Infinite | | | |
| Aperture 0 | | Infinite | -0.328 | | | |
| First lens element 1 | Object side Surface 15 | 2.295 | 0.387 | 1.545 | 55.987 | 50.301 |
| | Image side Surface 16 | 2.355 | 0.032 | | | |
| Second lens element 2 | Object side Surface 25 | 2.194 | 0.537 | 1.545 | 55.987 | 4.141 |
| | Image side Surface 26 | 66.559 | 0.090 | | | |
| Third lens element 3 | Object side Surface 35 | 4.738 | 0.240 | 1.661 | 20.412 | -8.782 |
| | Image side Surface 36 | 2.567 | 0.340 | | | |
| Fourth lens element 4 | Object side Surface 45 | 15.908 | 0.480 | 1.545 | 55.987 | 7.741 |
| | Image side Surface 46 | -5.698 | 0.148 | | | |
| Fifth lens element 5 | Object side Surface 55 | -1.665 | 0.322 | 1.545 | 55.987 | 188.230 |
| | Image side Surface 56 | -1.751 | 0.035 | | | |
| Sixth lens element 6 | Object side Surface 65 | 2.874 | 0.280 | 1.661 | 20.412 | -20.783 |
| | Image side Surface 66 | 2.288 | 0.337 | | | |
| Seventh lens element 7 | Object side Surface 75 | 2.090 | 0.442 | 1.545 | 55.987 | 4.610 |
| | Image side Surface 76 | 11.358 | 0.323 | | | |
| Eighth lens element 8 | Object side Surface 85 | -2.924 | 0.320 | 1.545 | 55.987 | -3.289 |
| | Image side Surface 86 | 4.841 | 0.488 | | | |
| Filter 9 | Object side Surface 95 | Infinite | 0.210 | 1.517 | 64.167 | |
| | Image side Surface 96 | Infinite | 0.270 | | | |
| | Image plane 99 | Infinite | 0.000 | | | |

FIG. 28

| Surface | K | $a_4$ | $a_6$ | $a_8$ |
|---|---|---|---|---|
| 15 | 0.000000E+00 | -2.150160E-02 | 9.252046E-03 | -3.075916E-03 |
| 16 | 0.000000E+00 | -7.986030E-02 | -2.283355E-02 | 1.637273E-02 |
| 25 | 0.000000E+00 | -4.330140E-02 | -3.438602E-02 | -9.150154E-03 |
| 26 | 0.000000E+00 | 4.216759E-02 | -9.210442E-02 | 3.022541E-02 |
| 35 | 0.000000E+00 | -1.225416E-01 | 2.164354E-02 | 1.036382E-02 |
| 36 | 0.000000E+00 | -1.582460E-01 | 1.015386E-01 | -6.251970E-02 |
| 45 | 0.000000E+00 | -4.301953E-02 | -9.829305E-03 | -5.092658E-03 |
| 46 | 0.000000E+00 | -5.315145E-02 | -9.877260E-03 | 7.135989E-03 |
| 55 | 0.000000E+00 | 6.784886E-02 | -1.268911E-03 | 4.776557E-02 |
| 56 | 0.000000E+00 | 4.146024E-02 | 2.388377E-02 | 2.240684E-03 |
| 65 | 0.000000E+00 | -9.564079E-02 | -1.210521E-03 | 1.902657E-02 |
| 66 | 0.000000E+00 | -1.676920E-01 | 6.108970E-02 | -1.613793E-02 |
| 75 | 0.000000E+00 | -1.456531E-01 | 7.103609E-03 | 3.138270E-04 |
| 76 | 0.000000E+00 | -2.147243E-03 | -2.161701E-02 | 3.510751E-03 |
| 85 | 0.000000E+00 | 1.525652E-02 | 2.061826E-03 | -3.329790E-04 |
| 86 | 0.000000E+00 | -4.614162E-02 | 4.564833E-03 | 6.128200E-05 |
| Surface | $a_{10}$ | $a_{12}$ | $a_{14}$ | |
| 15 | 4.201771E-03 | -4.705079E-03 | 1.830959E-03 | |
| 16 | -2.006240E-04 | -6.623220E-04 | 1.685440E-03 | |
| 25 | 7.716884E-03 | 6.810704E-03 | -2.515638E-03 | |
| 26 | 3.423183E-03 | -6.844433E-03 | 1.794506E-03 | |
| 35 | -2.523805E-02 | 1.357012E-02 | -3.623448E-03 | |
| 36 | 1.265344E-02 | -1.328739E-03 | -1.173240E-04 | |
| 45 | -6.200392E-03 | 6.879338E-03 | -1.181618E-03 | |
| 46 | -6.210155E-03 | 2.608220E-03 | -9.888400E-05 | |
| 55 | -3.643616E-02 | 1.130776E-02 | -1.893834E-03 | |
| 56 | 3.909743E-03 | -5.171634E-03 | 1.659950E-03 | |
| 65 | -1.781699E-02 | 5.070099E-03 | -2.754250E-04 | |
| 66 | -2.048926E-03 | 1.631132E-03 | -1.614370E-04 | |
| 75 | -1.992995E-03 | 5.511790E-04 | -1.450700E-05 | |
| 76 | 4.382600E-04 | -9.565200E-05 | 1.507000E-06 | |
| 85 | 4.425300E-05 | 6.890000E-07 | -3.670000E-07 | |
| 86 | -6.010300E-05 | -1.511000E-06 | 6.170000E-07 | |

FIG. 29

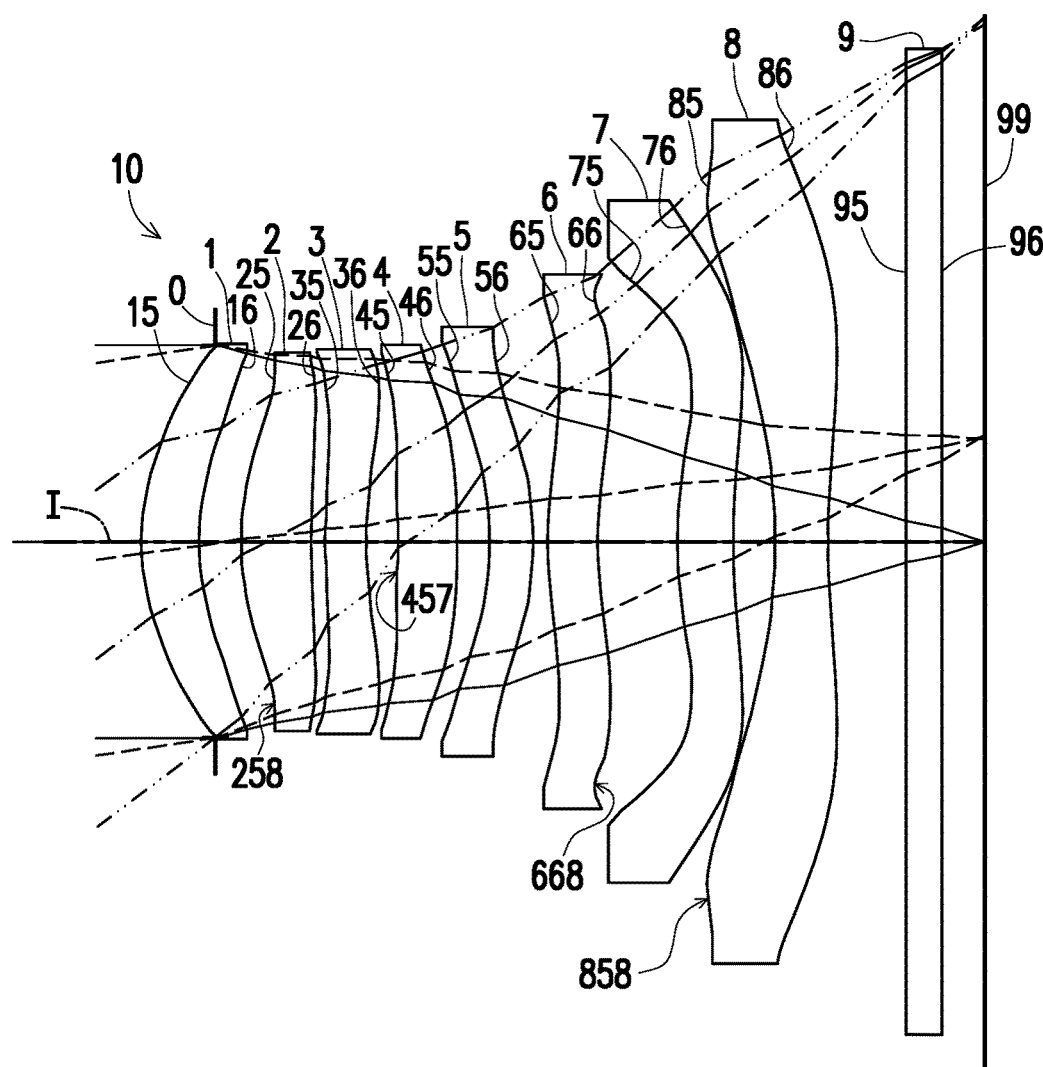
FIG. 30
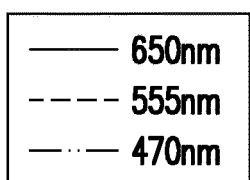
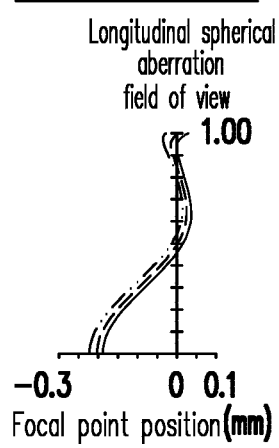
FIG. 31A
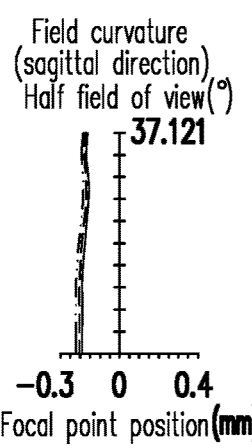
FIG. 31B
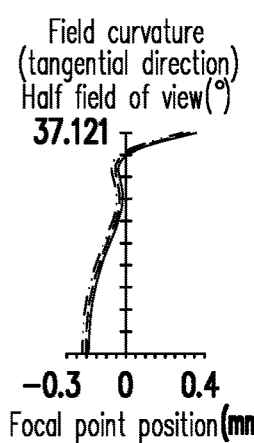
FIG. 31C
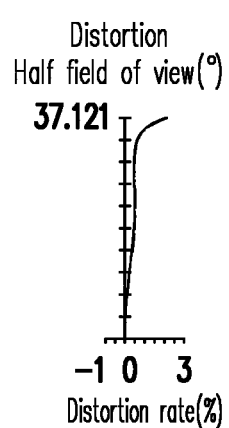
FIG. 31D

| Seventh embodiment ||||||
| --- | --- | --- | --- | --- | --- | --- |
| EFL =3.893 mm, HFOV =37.121°, Fno =1.6, TTL =5.211 mm, Image height =3.238 mm ||||||
| lens element | Surface | Radius (mm) | Distance (mm) | Refractive index | Abbe number | Focal length (mm) |
| Object | | Infinite | Infinite | | | |
| Aperture 0 | | Infinite | -0.455 | | | |
| First lens element 1 | Object side Surface 15 | 1.575 | 0.356 | 1.545 | 55.987 | 23.621 |
| | Image side Surface 16 | 1.650 | 0.261 | | | |
| Second lens element 2 | Object side Surface 25 | 1.933 | 0.433 | 1.545 | 55.987 | 4.223 |
| | Image side Surface 26 | 10.965 | 0.090 | | | |
| Third lens element 3 | Object side Surface 35 | 5.424 | 0.250 | 1.661 | 20.412 | -8.408 |
| | Image side Surface 36 | 2.707 | 0.192 | | | |
| Fourth lens element 4 | Object side Surface 45 | -168.057 | 0.370 | 1.545 | 55.987 | 8.276 |
| | Image side Surface 46 | -4.406 | 0.198 | | | |
| Fifth lens element 5 | Object side Surface 55 | -1.838 | 0.268 | 1.545 | 55.987 | 86.866 |
| | Image side Surface 56 | -1.860 | 0.093 | | | |
| Sixth lens element 6 | Object side Surface 65 | 2.988 | 0.309 | 1.661 | 20.412 | -173.335 |
| | Image side Surface 66 | 2.792 | 0.487 | | | |
| Seventh lens element 7 | Object side Surface 75 | 2.429 | 0.349 | 1.545 | 55.987 | 7.649 |
| | Image side Surface 76 | 5.507 | 0.259 | | | |
| Eighth lens element 8 | Object side Surface 85 | -3.388 | 0.327 | 1.545 | 55.987 | -3.765 |
| | Image side Surface 86 | 5.414 | 0.488 | | | |
| Filter 9 | Object side Surface 95 | Infinite | 0.210 | 1.517 | 64.167 | |
| | Image side Surface 96 | Infinite | 0.270 | | | |
| | Image plane 99 | Infinite | 0.000 | | | |

FIG. 32

| Surface | K | $a_4$ | $a_6$ | $a_8$ |
|---|---|---|---|---|
| 15 | 0.000000E+00 | -5.610900E-02 | 7.562440E-03 | -3.789233E-03 |
| 16 | 0.000000E+00 | -8.920110E-02 | -2.970294E-02 | 1.744432E-02 |
| 25 | 0.000000E+00 | -3.407973E-02 | -3.379992E-02 | -2.005093E-02 |
| 26 | 0.000000E+00 | 3.639902E-02 | -9.719030E-02 | 3.177577E-02 |
| 35 | 0.000000E+00 | -1.242335E-01 | 3.043786E-02 | 8.047442E-03 |
| 36 | 0.000000E+00 | -1.472766E-01 | 8.793555E-02 | -6.649676E-02 |
| 45 | 0.000000E+00 | -4.183126E-02 | -6.875380E-03 | -8.068755E-03 |
| 46 | 0.000000E+00 | -5.402492E-02 | -7.986294E-03 | 1.414987E-02 |
| 55 | 0.000000E+00 | 5.987555E-02 | 1.708323E-03 | 4.514737E-02 |
| 56 | 0.000000E+00 | 5.176648E-02 | 2.436182E-02 | 5.537623E-03 |
| 65 | 0.000000E+00 | -1.167007E-01 | 7.166058E-03 | 2.095083E-02 |
| 66 | 0.000000E+00 | -1.550693E-01 | 6.021519E-02 | -1.615330E-02 |
| 75 | 0.000000E+00 | -1.259274E-01 | -7.180965E-05 | -7.867023E-04 |
| 76 | 0.000000E+00 | -1.971277E-02 | -2.177049E-02 | 3.567498E-03 |
| 85 | 0.000000E+00 | 1.337893E-02 | 1.660842E-03 | -3.694217E-04 |
| 86 | 0.000000E+00 | -4.771152E-02 | 4.899070E-03 | 1.031863E-04 |
| Surface | $a_{10}$ | $a_{12}$ | $a_{14}$ | |
| 15 | 4.430024E-03 | -4.419231E-03 | 1.668744E-03 | |
| 16 | -6.387789E-04 | -2.281845E-03 | 7.250149E-04 | |
| 25 | 2.564392E-03 | 6.559219E-03 | -2.810904E-03 | |
| 26 | 2.548483E-03 | -8.060414E-03 | 3.690820E-03 | |
| 35 | -2.644356E-02 | 1.502512E-02 | -2.848963E-03 | |
| 36 | 1.032761E-02 | -2.144637E-03 | 1.778012E-03 | |
| 45 | -5.024234E-03 | 9.330025E-03 | -6.001054E-04 | |
| 46 | -3.824302E-03 | 2.854834E-03 | 1.173773E-03 | |
| 55 | -3.728663E-02 | 1.169784E-02 | -2.304222E-03 | |
| 56 | 5.300585E-03 | -5.497438E-03 | 8.045955E-04 | |
| 65 | -1.778972E-02 | 4.989590E-03 | -2.587577E-04 | |
| 66 | -1.844307E-03 | 1.721248E-03 | -1.447275E-04 | |
| 75 | -1.982846E-03 | 6.414063E-04 | 3.696719E-05 | |
| 76 | 4.466594E-04 | -9.505148E-05 | 1.405652E-06 | |
| 85 | 4.205043E-05 | 8.602777E-07 | -2.445251E-07 | |
| 86 | -5.588800E-05 | -1.270450E-06 | 5.890711E-07 | |

FIG. 33

| Condition | First embodiment | Second embodiment | Third embodiment | Fourth embodiment | Fifth embodiment | Sixth embodiment | Seventh embodiment |
|---|---|---|---|---|---|---|---|
| T1 | 0.480 | 0.443 | 0.458 | 0.282 | 0.479 | 0.387 | 0.356 |
| G12 | 0.133 | 0.139 | 0.122 | 0.029 | 0.095 | 0.032 | 0.261 |
| T2 | 0.546 | 0.532 | 0.563 | 0.400 | 0.575 | 0.537 | 0.433 |
| G23 | 0.045 | 0.042 | 0.043 | 0.035 | 0.048 | 0.090 | 0.090 |
| T3 | 0.240 | 0.240 | 0.240 | 0.240 | 0.240 | 0.240 | 0.250 |
| G34 | 0.297 | 0.407 | 0.423 | 0.212 | 0.314 | 0.340 | 0.192 |
| T4 | 0.530 | 0.594 | 0.828 | 0.495 | 0.595 | 0.480 | 0.370 |
| G45 | 0.178 | 0.224 | 0.203 | 0.316 | 0.147 | 0.148 | 0.198 |
| T5 | 0.444 | 0.426 | 0.307 | 0.301 | 0.462 | 0.322 | 0.268 |
| G56 | 0.035 | 0.035 | 0.035 | 0.035 | 0.035 | 0.035 | 0.093 |
| T6 | 0.280 | 0.280 | 0.280 | 0.280 | 0.280 | 0.280 | 0.309 |
| G67 | 0.224 | 0.197 | 0.113 | 0.142 | 0.110 | 0.337 | 0.487 |
| T7 | 0.466 | 0.422 | 0.498 | 0.383 | 0.603 | 0.442 | 0.349 |
| G78 | 0.316 | 0.418 | 0.416 | 0.257 | 0.306 | 0.323 | 0.259 |
| T8 | 0.320 | 0.320 | 0.320 | 0.320 | 0.320 | 0.320 | 0.327 |
| G8F | 0.488 | 0.488 | 0.488 | 0.488 | 0.488 | 0.488 | 0.488 |
| TF | 0.210 | 0.210 | 0.210 | 0.210 | 0.210 | 0.210 | 0.210 |
| GFP | 0.270 | 0.270 | 0.270 | 0.270 | 0.270 | 0.270 | 0.270 |
| BFL | 0.968 | 0.968 | 0.968 | 0.968 | 0.968 | 0.968 | 0.968 |
| TTL | 5.502 | 5.686 | 5.816 | 4.695 | 5.577 | 5.281 | 5.211 |
| EFL | 4.172 | 4.275 | 4.325 | 3.639 | 4.144 | 3.989 | 3.893 |
| TL | 4.534 | 4.719 | 4.848 | 3.728 | 4.609 | 4.313 | 4.243 |
| ALT | 3.306 | 3.257 | 3.493 | 2.701 | 3.554 | 3.009 | 2.663 |
| AAG | 1.228 | 1.462 | 1.355 | 1.027 | 1.055 | 1.304 | 1.581 |

FIG. 34

| Condition | First embodiment | Second embodiment | Third embodiment | Fourth embodiment | Fifth embodiment | Sixth embodiment | Seventh embodiment |
|---|---|---|---|---|---|---|---|
| ALT/(T4+G45) | 4.670 | 3.981 | 3.387 | 3.329 | 4.790 | 4.794 | 4.684 |
| (G34+G78)/T3 | 2.550 | 3.437 | 3.493 | 1.956 | 2.582 | 2.762 | 1.804 |
| AAG/(G12+G23+G67) | 3.049 | 3.865 | 4.869 | 4.981 | 4.167 | 2.843 | 1.886 |
| TL/BFL | 4.685 | 4.875 | 5.009 | 3.852 | 4.762 | 4.456 | 4.384 |
| (T6+T7+T8)/(G12+G45+G67) | 1.990 | 1.826 | 2.502 | 2.014 | 3.420 | 2.017 | 1.041 |
| (T1+T2+T4)/(T5+T6) | 2.150 | 2.222 | 3.152 | 2.025 | 2.223 | 2.331 | 2.010 |
| (G45+T5+G56)/T6 | 2.347 | 2.446 | 1.947 | 2.331 | 2.300 | 1.804 | 1.809 |
| AAG/G45+T5+G67) | 1.452 | 1.726 | 2.174 | 1.352 | 1.467 | 1.616 | 1.658 |
| (T4+G45+T5)/(G56+T6) | 3.656 | 3.949 | 4.247 | 3.532 | 3.822 | 3.016 | 2.080 |
| (T1+T2+T3)/(G23+G34) | 3.705 | 2.704 | 2.707 | 3.731 | 3.572 | 2.710 | 3.684 |
| AAG/(G23+G45) | 5.493 | 5.492 | 5.495 | 2.924 | 5.396 | 5.491 | 5.491 |
| ALT/(T3+T4) | 4.295 | 3.904 | 3.272 | 3.675 | 4.257 | 4.179 | 4.291 |
| (G78+T8)/G67 | 2.839 | 3.745 | 6.499 | 4.056 | 5.689 | 1.908 | 1.202 |
| (T4+T6)/G45 | 4.544 | 3.905 | 5.443 | 2.449 | 5.950 | 5.147 | 3.428 |
| (G34+G45)/G78 | 1.504 | 1.509 | 1.507 | 2.056 | 1.508 | 1.509 | 1.509 |
| (T5+T6)/T3 | 3.016 | 2.941 | 2.444 | 2.422 | 3.092 | 2.510 | 2.305 |
| EFL/(G45+T5) | 6.706 | 6.579 | 8.480 | 5.892 | 6.804 | 8.485 | 8.356 |
| T6/(G12+G45) | 0.898 | 0.772 | 0.860 | 0.810 | 1.158 | 1.560 | 0.673 |

FIG. 35

OPTICAL IMAGING LENS

CROSS-REFERENCE TO RELATED APPLICATION

This application is a continuation application of and claims the priority benefit of a prior application Ser. No. 17/232,121, filed on Apr. 15, 2021. The prior application Ser. No. 17/232,121 is a continuation application of and claims the priority benefit of a prior application Ser. No. 16/673,974, filed on Nov. 5, 2019. The prior application Ser. No. 16/673,974 is a continuation application of and claims the priority benefit of a prior application Ser. No. 15/917,848, filed on Mar. 12, 2018, which claims the priority benefit of China application serial no. 201711482079.6, filed on Dec. 29, 2017. The entirety of each of the above-mentioned patent applications is hereby incorporated by reference herein and made a part of this specification.

BACKGROUND OF THE INVENTION

1. Field of the Invention

The invention relates to an optical imaging lens.

2. Description of Related Art

The increasing popularity of portable electronic products such as mobile phones and digital cameras in recent years lead to the prosperous development of technologies relating to image modules. An image module mainly includes devices such as an optical imaging lens, a module holder unit, and a sensor, and the trend of pursuing light-weightiness and compactness of mobile phones and digital cameras also facilitates the demands for miniaturizing image modules. Due to the development of the technologies for charge coupled devices (CCD) and complementary metal oxide semiconductor (CMOS) devices advance and the reduction of sizes thereof, the length of the optical imaging lens mounted in the image module also needs to be reduced. However, to ensure the effect and quality of photographing, the optical performance still needs to be considered while reducing the length of the optical imaging lens.

As portable electronic products (e.g., mobile phones, cameras, tablet computers, personal digital assistants, vehicle camera apparatuses, virtual reality trackers, and the like) with novel specifications emerge one after another, the development of a crucial part, i.e., the optical imaging lens, is also diversified. The applications of the optical imaging lens are beyond photographing and film recording but further include surveillance of surrounding as well as video recording during driving. Moreover, as image sensing technologies advance, the consumer's demands on imaging quality also become higher. Therefore, the optical imaging lens is not only designed for a better imaging quality and a smaller lens space. Attention is also required to cope with driving or low-brightness environments, the size of field of view and aperture, and near infrared detection.

However, when designing an optical imaging lens, an optical lens having both a miniaturized size and a desirable imaging quality cannot be manufactured by simply scaling down a lens with a desirable imaging quality. The design not only involves material properties but also needs to take practical production issues, such as manufacturing and assembling yield rates, into consideration.

Particularly, the technical level of manufacturing a miniaturized lens is higher than that of manufacturing a traditional lens. Therefore, how to manufacture an optical imaging lens meeting the needs of consumer electronic products and facilitate the imaging quality of such optical lens has been an issue of this field.

SUMMARY OF THE INVENTION

One or some exemplary embodiments of the invention provide an optical imaging lens capable of maintaining a preferable optical performance under a condition that a system length of the optical imaging lens is reduced.

An embodiment of the invention provides an optical imaging lens including a first lens element, a second lens element, a third lens element, a fourth lens element, a fifth lens element, a sixth lens element, a seventh lens element, and an eighth lens element sequentially arranged along an optical axis from an object side to an image side. Each of the first to eight lens elements includes an object-side surface facing toward the object side and allowing imaging rays to pass through and an image-side surface facing toward the image side and allowing the imaging rays to pass through. The first lens element has positive refracting power. The second lens element has positive refracting power. The third lens element has negative refracting power. The fifth lens element has positive refracting power. An optical axis region of the object-side surface of the sixth lens element is convex. The seventh lens element has positive refracting power, and an optical axis region of the object-side surface of the seventh lens element is convex. The optical imaging lens satisfies: $EFL/(G45+T5) \leq 8.500$, wherein EFL is an effective focal length of the optical imaging lens, G45 is an air gap from the fourth lens element to the fifth lens element along the optical axis, and T5 is a thickness of the fifth lens element along the optical axis.

An embodiment of the invention provides an optical imaging lens including a first lens element, a second lens element, a third lens element, a fourth lens element, a fifth lens element, a sixth lens element, a seventh lens element, and an eighth lens element sequentially arranged along an optical axis from an object side to an image side. Each of the first to eighth lens elements has an object-side surface facing toward the object side and allowing imaging rays to pass through and an image-side surface facing toward the image side and allowing the imaging rays to pass through. Aa periphery axis region of the image-side surface of the fifth lens element is concave. An optical axis region of the image-side surface of the second lens element is concave. The sixth lens element has negative refracting power. An optical axis region of the image-side surface of the seventh lens element is concave. The eighth lens element has negative refracting power, and a periphery axis region of the object-side surface of the eighth lens element is concave. The optical imaging lens satisfies: $EFL/(G45+T5) \leq 8.500$ and $(T4+T6)/G45 \leq 6.000$, wherein EFL is an effective focal length of the optical imaging lens, G45 is an air gap from the fourth lens element to the fifth lens element along the optical axis, T4 is a thickness of the fourth lens element along the optical axis, T5 is a thickness of the fifth lens element along the optical axis, and T6 is a thickness of the sixth lens element along the optical axis.

An embodiment of the invention provides an optical imaging lens including a first lens element, a second lens element, a third lens element, a fourth lens element, a fifth lens element, a sixth lens element, a seventh lens element, and an eighth lens element sequentially arranged along an optical axis from an object side to an image side. Each of the first to eighth lens elements has an object-side surface facing toward the object side and allowing imaging rays to pass through and an image-side surface facing toward the image side and allowing the imaging rays to pass through. The first lens element has positive refracting power. An optical axis region of the image-side surface of the sixth lens element is concave. An optical axis region of the image-side surface of the seventh lens element is concave. The optical imaging lens satisfies: $(T1+T2+T4)/(T5+T6) \geq 2.000$ and $EFL/(G45+T5) \leq 8.500$, wherein T1 is a thickness of the first lens element along the optical axis, T2 is a thickness of the second lens element along the optical axis, T4 is a thickness of the fourth lens element along the optical axis, T5 is a thickness of the fifth lens element along the optical axis, T6 is a thickness of the sixth lens element along the optical axis, EFL is an effective focal length of the optical imaging lens, and G45 is an air gap from the fourth lens element to the fifth lens element along the optical axis.

Based on the above, the optical imaging lens according to the embodiments of the invention is effective in terms of the following. By design and arranging the concave/convex shapes of the object-side surfaces or image-side surfaces of the lens elements, the optical imaging lens is still provided with an optical performance capable of overcoming aberrations and renders a desirable imaging quality under the condition that the system length of the optical imaging lens is reduced.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 6 is a schematic diagram illustrating an optical imaging lens according to a first embodiment of the invention.

FIGS. 7A to 7D are diagrams illustrating a longitudinal spherical aberration and various aberrations of the optical imaging lens according to the first embodiment.

FIG. 8 shows detailed optical data of the optical imaging lens according to the first embodiment of the invention.

FIG. 9 shows aspheric parameters pertaining to the optical imaging lens according to the first embodiment of the invention.

FIG. 10 is a schematic diagram illustrating an optical imaging lens according to a second embodiment of the invention.

FIGS. 11A to 11D are diagrams illustrating a longitudinal spherical aberration and various aberrations of the optical imaging lens according to the second embodiment.

FIG. 12 shows detailed optical data of the optical imaging lens according to the second embodiment of the invention.

FIG. 13 shows aspheric parameters pertaining to the optical imaging lens according to the second embodiment of the invention.

FIG. 14 is a schematic diagram illustrating an optical imaging lens according to a third embodiment of the invention.

FIGS. 15A to 15D are diagrams illustrating a longitudinal spherical aberration and various aberrations of the optical imaging lens according to the third embodiment.

FIG. 16 shows detailed optical data of the optical imaging lens according to the third embodiment of the invention.

FIG. 17 shows aspheric parameters pertaining to the optical imaging lens according to the third embodiment of the invention.

FIG. 18 is a schematic diagram illustrating an optical imaging lens according to a fourth embodiment of the invention.

FIGS. 19A to 19D are diagrams illustrating a longitudinal spherical aberration and various aberrations of the optical imaging lens according to the fourth embodiment.

FIG. 20 shows detailed optical data of the optical imaging lens according to the fourth embodiment of the invention.

FIG. 21 shows aspheric parameters pertaining to the optical imaging lens according to the fourth embodiment of the invention.

FIG. 22 is a schematic diagram illustrating an optical imaging lens according to a fifth embodiment of the invention.

FIGS. 23A to 23D are diagrams illustrating a longitudinal spherical aberration and various aberrations of the optical imaging lens according to the fifth embodiment.

FIG. 24 shows detailed optical data of the optical imaging lens according to the fifth embodiment of the invention.

FIG. 25 shows aspheric parameters pertaining to the optical imaging lens according to the fifth embodiment of the invention.

FIG. 26 is a schematic diagram illustrating an optical imaging lens according to a sixth embodiment of the invention.

FIGS. 27A to 27D are diagrams illustrating a longitudinal spherical aberration and various aberrations of the optical imaging lens according to the sixth embodiment.

FIG. 28 shows detailed optical data of the optical imaging lens according to the sixth embodiment of the invention.

FIG. 29 shows aspheric parameters pertaining to the optical imaging lens according to the sixth embodiment of the invention.

FIG. 30 is a schematic diagram illustrating an optical imaging lens according to a seventh embodiment of the invention.

FIGS. 31A to 31D are diagrams illustrating a longitudinal spherical aberration and various aberrations of the optical imaging lens according to the seventh embodiment.

FIG. 32 shows detailed optical data of the optical imaging lens according to the seventh embodiment of the invention.

FIG. 33 shows aspheric parameters pertaining to the optical imaging lens according to the seventh embodiment of the invention.

FIGS. 34 and 35 show values of respective important parameters and relations thereof of the optical imaging lenses according to the first to seventh embodiments of the invention.

DESCRIPTION OF THE EMBODIMENTS

Figure 2:
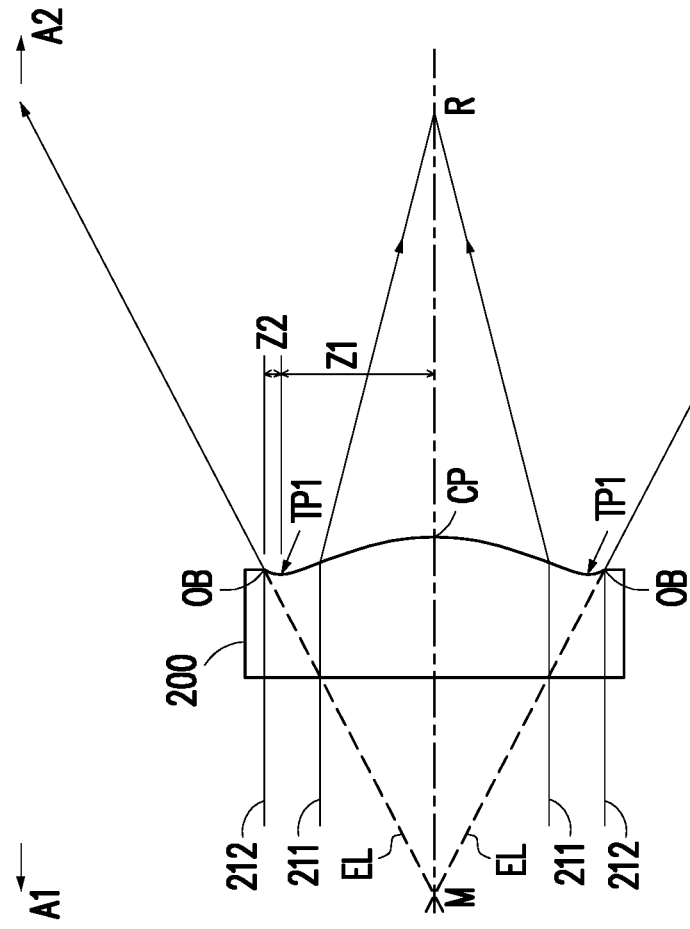
FIG. 2 is a schematic diagram illustrating surface shape concave and convex structures and a light focal point of a lens element.

Reference will now be made in detail to the present preferred embodiments of the invention, examples of which are illustrated in the accompanying drawings. Wherever possible, the same reference numbers are used in the drawings and the description to refer to the same or like parts.

Figure 1:
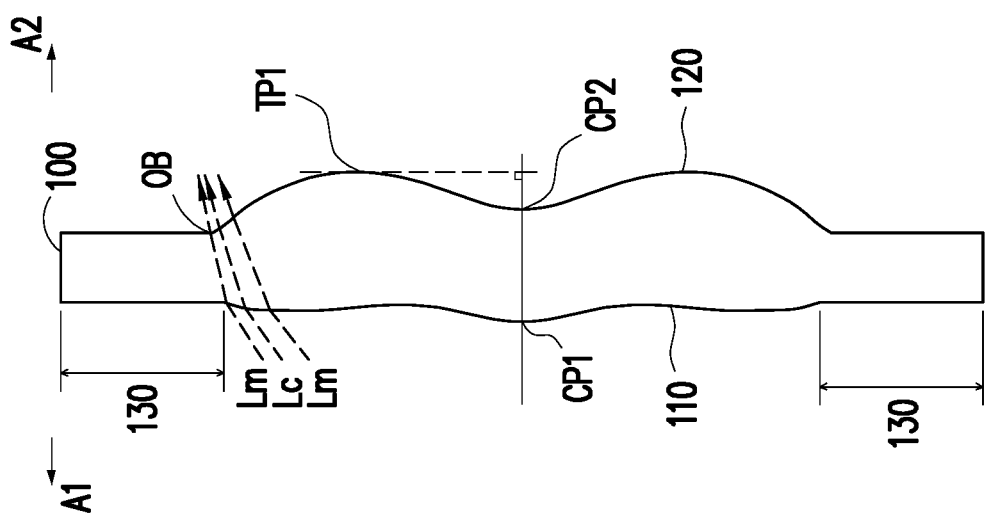
FIG. 1 is a schematic diagram illustrating a surface shape structure of a lens element.

In the present disclosure, the optical system may comprise at least one lens element to receive imaging rays that are incident on the optical system over a set of angles ranging from parallel to an optical axis to a half field of view (HFOV) angle with respect to the optical axis. The imaging rays pass through the optical system to produce an image on an image plane. The term "a lens element having positive refracting power (or negative refracting power)" means that the paraxial refracting power of the lens element in Gaussian optics is positive (or negative). The term "an object-side (or image-side) surface of a lens element" refers to a specific region of that surface of the lens element at which imaging rays can pass through that specific region. Imaging rays include at least two types of rays: a chief ray Lc and a marginal ray Lm (as shown in FIG. 1). An object-side (or image-side) surface of a lens element can be characterized as having several regions, including an optical axis region, a periphery region, and, in some cases, one or more intermediate regions, as discussed more fully below.

Figure 4:
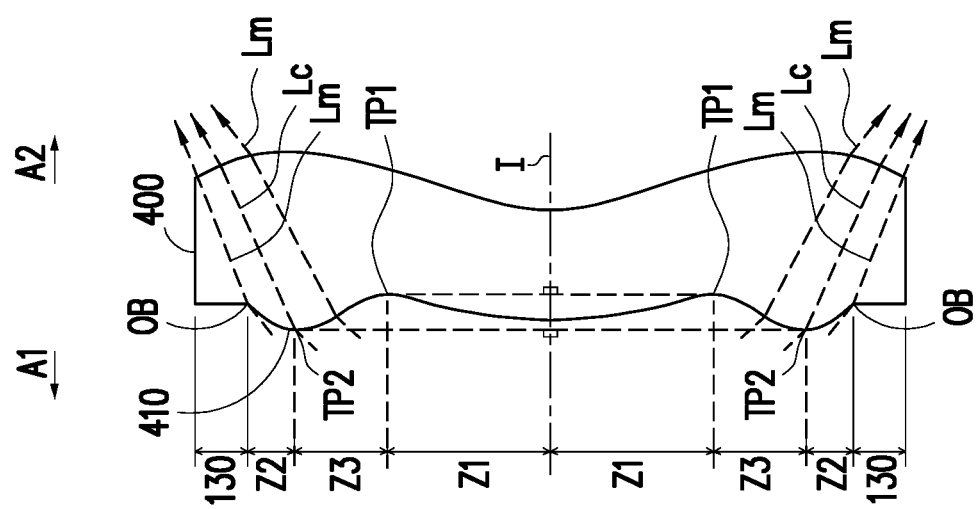
FIG. 4 is a schematic diagram illustrating a surface shape structure of a lens element according to Example 2.

FIG. 1 is a radial cross-sectional view of a lens element 100. Two referential points for the surfaces of the lens element 100 can be defined: a central point, and a transition point. The central point of a surface of a lens element is a point of intersection of that surface and the optical axis I. As illustrated in FIG. 1, a first central point CP1 may be present on the object-side surface 110 of lens element 100 and a second central point CP2 may be present on the image-side surface 120 of the lens element 100. The transition point is a point on a surface of a lens element, at which the line tangent to that point is perpendicular to the optical axis I. The optical boundary OB of a surface of the lens element is defined as a point at which the radially outermost marginal ray Lm passing through the surface of the lens element intersects the surface of the lens element. All transition points lie between the optical axis I and the optical boundary OB of the surface of the lens element. If multiple transition points are present on a single surface, then these transition points are sequentially named along the radial direction of the surface with reference numerals starting from the first transition point. For example, the first transition point, e.g., TP1, (closest to the optical axis I), the second transition point, e.g., TP2, (as shown in FIG. 4), and the Nth transition point (farthest from the optical axis I).

The region of a surface of the lens element from the central point to the first transition point TP1 is defined as the optical axis region, which includes the central point. The region located radially outside of the farthest $N^{th}$ transition point from the optical axis I to the optical boundary OB of the surface of the lens element is defined as the periphery region. In some embodiments, there may be intermediate regions present between the optical axis region and the periphery region, with the number of intermediate regions depending on the number of the transition points.

The shape of a region is convex if a collimated ray being parallel to the optical axis I and passing through the region is bent toward the optical axis I such that the ray intersects the optical axis I on the image side A2 of the lens element. The shape of a region is concave if the extension line of a collimated ray being parallel to the optical axis I and passing through the region intersects the optical axis I on the object side A1 of the lens element.

Additionally, referring to FIG. 1, the lens element 100 may also have a mounting portion 130 extending radially outward from the optical boundary OB. The mounting portion 130 is typically used to physically secure the lens element to a corresponding element of the optical system (not shown). Imaging rays do not reach the mounting portion 130. The structure and shape of the mounting portion 130 are only examples to explain the technologies, and should not be taken as limiting the scope of the present disclosure. The mounting portion 130 of the lens elements discussed below may be partially or completely omitted in the following drawings.

Referring to FIG. 2, optical axis region Z1 is defined between central point CP and first transition point TP1. Periphery region Z2 is defined between TP1 and the optical boundary OB of the surface of the lens element. Collimated ray 211 intersects the optical axis I on the image side A2 of lens element 200 after passing through optical axis region Z1, i.e., the focal point of collimated ray 211 after passing through optical axis region Z1 is on the image side A2 of the lens element 200 at point R in FIG. 2. Accordingly, since the ray itself intersects the optical axis I on the image side A2 of the lens element 200, optical axis region Z1 is convex. On the contrary, collimated ray 212 diverges after passing through periphery region Z2. The extension line EL of collimated ray 212 after passing through periphery region Z2 intersects the optical axis I on the object side A1 of lens element 200, i.e., the focal point of collimated ray 212 after passing through periphery region Z2 is on the object side A1 at point M in FIG. 2. Accordingly, since the extension line EL of the ray intersects the optical axis I on the object side A1 of the lens element 200, periphery region Z2 is concave. In the lens element 200 illustrated in FIG. 2, the first transition point TP1 is the border of the optical axis region and the periphery region, i.e., TP1 is the point at which the shape changes from convex to concave.

Alternatively, there is another way for a person having ordinary skill in the art to determine whether an optical axis region is convex or concave by referring to the sign of "Radius" (the "R" value), which is the paraxial radius of shape of a lens surface in the optical axis region. The R value is commonly used in conventional optical design software such as Zemax and CodeV. The R value usually appears in the lens data sheet in the software. For an object-side surface, a positive R value defines that the optical axis region of the object-side surface is convex, and a negative R value defines that the optical axis region of the object-side surface is concave. Conversely, for an image-side surface, a positive R value defines that the optical axis region of the image-side surface is concave, and a negative R value defines that the optical axis region of the image-side surface is convex. The result found by using this method should be consistent with the method utilizing intersection of the optical axis by rays/extension lines mentioned above, which determines surface shape by referring to whether the focal point of a collimated ray being parallel to the optical axis I is on the object-side or the image-side of a lens element. As used herein, the terms "a shape of a region is convex (concave)," "a region is convex (concave)," and "a convex-(concave-) region," can be used alternatively.

Figure 5:
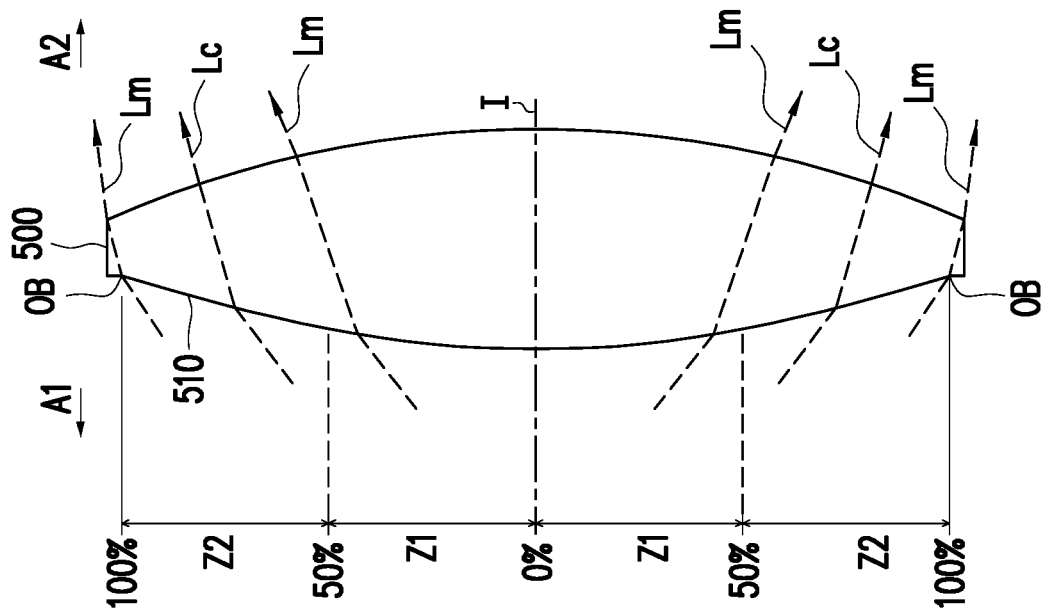
FIG. 5 is a schematic diagram illustrating a surface shape structure of a lens element according to Example 3.
Figure 3:
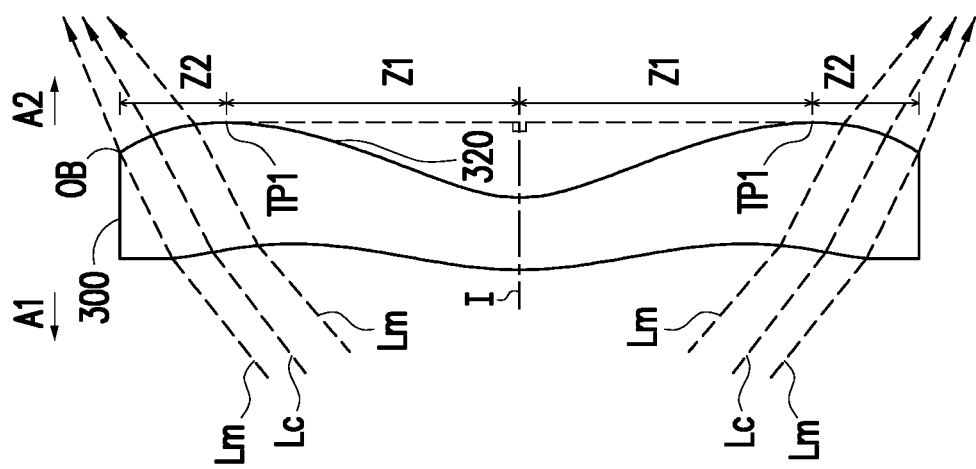
FIG. 3 is a schematic diagram illustrating a surface shape structure of a lens element according to Example 1.

FIG. 3, FIG. 4 and FIG. 5 illustrate examples of determining the shape of lens element regions and the boundaries of regions under various circumstances, including the optical axis region, the periphery region, and intermediate regions as set forth in the present specification.

FIG. 3 is a radial cross-sectional view of a lens element 300. As illustrated in FIG. 3, only one transition point TP1 appears within the optical boundary OB of the image-side surface 320 of the lens element 300. Optical axis region Z1 and periphery region Z2 of the image-side surface 320 of lens element 300 are illustrated. The R value of the image-side surface 320 is positive (i.e., R>0). Accordingly, the optical axis region Z1 is concave.

In general, the shape of each region demarcated by the transition point will have an opposite shape to the shape of the adjacent region(s). Accordingly, the transition point will define a transition in shape, changing from concave to convex at the transition point or changing from convex to concave. In FIG. 3, since the shape of the optical axis region Z1 is concave, the shape of the periphery region Z2 will be convex as the shape changes at the transition point TP1.

FIG. 4 is a radial cross-sectional view of a lens element 400. Referring to FIG. 4, a first transition point TP1 and a second transition point TP2 are present on the object-side surface 410 of lens element 400. The optical axis region Z1 of the object-side surface 410 is defined between the optical axis I and the first transition point TP1. The R value of the object-side surface 410 is positive (i.e., R>0). Accordingly, the optical axis region Z1 is convex.

The periphery region Z2 of the object-side surface 410, which is also convex, is defined between the second transition point TP2 and the optical boundary OB of the object-side surface 410 of the lens element 400. Further, intermediate region Z3 of the object-side surface 410, which is concave, is defined between the first transition point TP1 and the second transition point TP2. Referring once again to FIG. 4, the object-side surface 410 includes an optical axis region Z1 located between the optical axis I and the first transition point TP1, an intermediate region Z3 located between the first transition point TP1 and the second transition point TP2, and a periphery region Z2 located between the second transition point TP2 and the optical boundary OB of the object-side surface 410. Since the shape of the optical axis region Z1 is designed to be convex, the shape of the intermediate region Z3 is concave as the shape of the intermediate region Z3 changes at the first transition point TP1, and the shape of the periphery region Z2 is convex as the shape of the periphery region Z2 changes at the second transition point TP2.

FIG. 5 is a radial cross-sectional view of a lens element 500. Lens element 500 has no transition point on the object-side surface 510 of the lens element 500. For a surface of a lens element with no transition point, for example, the object-side surface 510 the lens element 500, the optical axis region Z1 is defined as the region between 0-50% of the distance between the optical axis I and the optical boundary OB of the surface of the lens element and the periphery region is defined as the region between 50%-100% of the distance between the optical axis I and the optical boundary OB of the surface of the lens element. Referring to lens element 500 illustrated in FIG. 5, the optical axis region Z1 of the object-side surface 510 is defined between the optical axis I and 50% of the distance between the optical axis I and the optical boundary OB. The R value of the object-side surface 510 is positive (i.e., R>0). Accordingly, the optical axis region Z1 is convex. For the object-side surface 510 of the lens element 500, because there is no transition point, the periphery region Z2 of the object-side surface 510 is also convex. It should be noted that lens element 500 may have a mounting portion (not shown) extending radially outward from the periphery region Z2.

FIG. 6 is a schematic diagram illustrating an optical imaging lens according to a first embodiment of the invention. FIGS. 7A to 7D are diagrams illustrating a longitudinal spherical aberration and various aberrations of the optical imaging lens according to the first embodiment. Referring to FIG. 6, an optical imaging lens 10 includes an aperture 0, a first lens element 1, a second lens element 2, a third lens element 3, a fourth lens element 4, a fifth lens element 5, a sixth lens element 6, a seventh lens element 7, an eighth lens element 8, and a filter 9 sequentially arranged from an object side to an image side along an optical axis I. When a ray emitted from an object to be shot enters the optical imaging lens 10, an image may be formed on an image plane 99 after the ray passes through the aperture 0, the first lens element 1, the second lens element 2, the third lens element 3, the fourth lens element 4, the fifth lens element 5, the sixth lens element 6, the seventh lens element 7, the eighth lens element 8, and the filter 9. The filter 9 may be an infrared cut-off filter, for example, and is adapted to prevent a portion of infrared light in the ray from being transmitted to the image plane 99 and affecting the imaging quality. In addition, the object side is a side facing toward the object to be shot, whereas the image side is a side facing toward the image plane 99.

The first lens element 1, the second lens element 2, the third lens element 3, the fourth lens element 4, the fifth lens element 5, the sixth lens element 6, the seventh lens element 7, the eighth lens element 8 and the filter 9 respectively have object-side surfaces 15, 25, 35, 45, 55, 65, 75, 85, and 95 facing toward the object side and allowing imaging rays to pass through and image-side surfaces 16, 26, 36, 46, 56, 66, 76, 86 and 96 facing toward the image side and allowing the imaging rays to pass through.

To meet the needs for weight reduction of the product, materials of the first lens element 1 to the eighth lens element 8 may be plastic. However, the materials of the first lens element 1 to the eighth lens element 8 are not limited thereto.

In the following, the refracting powers and the surface shapes (convex surface and concave surface) of the respective lens elements are described with reference to the accompanying drawings.

The first lens element 1 has positive refracting power. On the object-side surface 15 of the first lens element 1, an optical axis region 155 and a periphery region 156 are convex. In addition, on the image-side surface 16 of the first lens element 1, an optical axis region 165 and a periphery region 166 are concave.

The second lens element 2 has positive refracting power. On the object-side surface 25 of the second lens element 2, an optical axis region 255 and a periphery region 256 are convex. In addition, on the image-side surface 26 of the second lens element 2, an optical axis region 265 is concave, and a periphery region 266 is convex.

The third lens element 3 has negative refracting power. On the object-side surface 35 of the third lens element 3, an optical axis region 355 is convex, and a periphery region 356 is concave. In addition, on the image-side surface 36 of the third lens element 3, an optical axis region 365 is concave, and a periphery region 366 is convex.

The fourth lens element 4 has positive refracting power. On the object-side surface 45 of the fourth lens element 4, an optical axis region 455 is convex, and a periphery region 456 is concave. In addition, on the image-side surface 46 of the fourth lens element 4, an optical axis region 465 and a periphery region 466 are convex.

The fifth lens element 5 has positive refracting power. On the object-side surface 55 of the fifth lens element 5, an optical axis region 555 and a periphery region 556 are concave. In addition, on the image-side surface 56 of the fifth lens element 5, an optical axis region 565 and a periphery region 566 are convex.

The sixth lens element 6 has negative refracting power. On the object-side surface 65 of the sixth lens element 6, an optical axis region 655 is convex, and a periphery region 656 is concave. In addition, on the image-side surface 66 of the sixth lens element 6, an optical axis region 665 is concave, and a periphery region 666 is convex.

The seventh lens element 7 has positive refracting power. On the object-side surface 75 of the seventh lens element 7, an optical axis region 755 is convex, and a periphery region 756 is concave. In addition, on the image-side surface 76 of the seventh lens element 7, an optical axis region 765 is concave, and a periphery region 766 is convex.

The eighth lens element 8 has negative refracting power. On the object-side surface 85 of the eighth lens element 8, an optical axis region 855 and a periphery region 856 are concave. In addition, on the image-side surface 86 of the eighth lens element 8, an optical axis region 865 is concave, and a periphery region 866 is convex.

In the optical imaging lens 10, only the above lens elements have refracting power, and the number of lens elements having a refracting power in the optical imaging lens 10 is eight.

Detailed optical data of the first embodiment are as shown in FIG. 8. In addition, the effective focal length (EFL) of the whole optical imaging lens 10 of the first embodiment is 4.172 mm, the half field of view (HFOV) thereof is 37.033, the f-number (Fno) thereof is 1.6, the system length (TTL) thereof is 5.502 mm, and the image height thereof is 3.238 mm. The system length refers to a distance from the object-side surface 15 of the first lens element 1 to the image plane 99 along the optical axis I.

Besides, in the embodiment, the object-side surfaces and the image-side surfaces of the eight lens elements, totaling 16 surfaces, are all aspheric surfaces. In addition, the aspheric surfaces are defined based on the following equation:

$$Z(Y) = \frac{Y^2}{R} / \left(1 + \sqrt{1 - (1+K)\frac{Y^2}{R^2}}\right) + \sum_{i=1}^{n} a_i \times Y^i \quad (1)$$

wherein:
Y: a distance from a point on an aspheric curve to the optical axis I;
Z: a depth of an aspheric surface (i.e., a vertical distance between the point on the aspheric surface that is spaced by the distance Y from the optical axis I and a tangent plane tangent to a vertex of the aspheric surface on the optical axis I);
R: a radius of curvature of the surface of the lens element proximate the optical axis I;
K: a conic constant;
$a_i$: an $i^{th}$ aspheric coefficient.

Respective aspheric coefficients of the object-side surfaces 15, 25, 35, 45, 55, 65, 75, and 85 and the image-side surfaces 16, 26, 36, 46, 56, 66, 76, and 86 in Equation (1) are as shown in FIG. 9. For example, the row number 15 in FIG. 9 indicates that the values are aspheric coefficients of the object-side surface 15 of the first lens element 1. Other rows are arranged based on the same principle.

In addition, relations of important parameters in the optical imaging lens 10 according to the first embodiment are as shown in FIGS. 34 and 35. In the optical imaging lens 10 of the first embodiment,
T1 is a thickness of the first lens element 1 along the optical axis I;
T2 is a thickness of the second lens element 2 along the optical axis I;
T3 is a thickness of the third lens element 3 along the optical axis I;
T4 is a thickness of the fourth lens element 4 along the optical axis I;
T5 is a thickness of the fifth lens element 5 along the optical axis I;
T6 is a thickness of the sixth lens element 6 along the optical axis I;
T7 is a thickness of the seventh lens element 7 along the optical axis I;
T8 is a thickness of the eighth lens element 8 along the optical axis I;
TF is a thickness of the filter 9 along the optical axis I;
G12 is an air gap from the first lens element 1 to the second lens element 2 along the optical axis I;
G23 is an air gap from the second lens element 2 to the third lens element 3 along the optical axis I;
G34 is an air gap from the third lens element 3 to the fourth lens element 4 along the optical axis I;
G45 is an air gap from the fourth lens element 4 to the fifth lens element 5 along the optical axis I;
G56 is an air gap from the fifth lens element 5 to the sixth lens element 6 along the optical axis I;
G67 is an air gap from the sixth lens element 6 to the seventh lens element 7 along the optical axis I;
G78 is an air gap from the seventh lens element 7 to the eighth lens element 8 along the optical axis I;
G8F is an air gap from the eighth lens element 8 to the filter 9 along the optical axis I;
GFP is an air gap from the filter 9 to the image plane 99 along the optical axis I;
AAG is a sum of the seven air gaps from the first lens element 1 to the eighth lens element 8 along the optical axis I;
ALT is a sum of the thicknesses of the first lens element 1, the second lens element 2, the third lens element 3, the fourth lens element 4, the fifth lens element 5, the sixth lens element 6, the seventh lens element 7, and the eighth lens element 8 along the optical axis I;
EFL is an effective focal length of the optical imaging lens 10;
BFL is a distance from the image-side surface 86 of the eighth lens element 8 to the image plane 99 along the optical axis I;
TTL is a distance from the object-side surface 15 of the first lens element 1 to the image plane 99 along the optical axis I;
TL is a distance from the object-side surface 15 of the first lens element 1 to the image-side surface 86 of the eighth lens element 8 along the optical axis I; and
HFOV is a half field of view of the optical imaging lens 10.
Besides, it is further defined as follows:
V1 is an Abbe number of the first lens element 1, wherein the Abbe number may also be referred to as a dispersion coefficient;
V2 is an Abbe number of the second lens element 2;
V3 is an Abbe number of the third lens element 3;
V4 is an Abbe number of the fourth lens element 4;
V5 is an Abbe number of the fifth lens element 5;
V6 is an Abbe number of the sixth lens element 6;
V7 is an Abbe number of the seventh lens element 7;
V8 is an Abbe number of the eighth lens element 8;
f1 is a focal length of the first lens element 1;
f2 is a focal length of the second lens element 2;

f3 is a focal length of the third lens element 3;
f4 is a focal length of the fourth lens element 4;
f5 is a focal length of the fifth lens element 5;
f6 is a focal length of the sixth lens element 6;
f7 is a focal length of the seventh lens element 7;
f8 is a focal length of the eighth lens element 8;
n1 is a refractive index of the first lens element 1;
n2 is a refractive index of the second lens element 2;
n3 is a refractive index of the third lens element 3;
n4 is a refractive index of the fourth lens element 4;
n5 is a refractive index of the fifth lens element 5;
n6 is a refractive index of the sixth lens element 6;
n7 is a refractive index of the seventh lens element 7; and
n8 is a refractive index of the eighth lens element 8.

Referring to FIGS. 7A to 7D, FIG. 7A illustrates the longitudinal spherical aberration of optical imaging lens 10 of the first embodiment when the pupil radius of the first embodiment is 1.3037 mm. In FIG. 7A, the curves representing the respective wavelengths are close to each other and approach the center, indicating that off-axis rays in different heights at the respective wavelengths are concentrated in a vicinity of the imaging point. Based on extents of deviation of the curves for the respective wavelengths, imaging point deviations of the off-axis rays in different heights are controlled within a range from −0.019 mm to 0.014 mm. Therefore, the spherical aberration of the same wavelength is reduced in the optical imaging lens of the first embodiment. In addition, the distances among the three representing wavelengths are close, indicating that imaging positions of rays of different wavelengths are concentrated. Hence, chromatic aberration is also suppressed.

FIGS. 7B and 7C respectively illustrate the field curvature aberration in the sagittal direction and the field curvature aberration in the tangential direction on the image plane 99 when the wavelength is 650 mm, 555 mm, and 470 mm. In FIGS. 7B and 7C illustrating the field curvature aberrations, focal length variations of the three representing wavelengths in the whole field range fall within a range from −0.05 mm to 0.02 mm, indicating that the optical imaging lens of the first embodiment is able to effectively reduce aberration.

FIG. 7D illustrates the distortion aberration on the image plane 99 when the wavelength is 650 mm, 555 mm, and 470 mm. FIG. 7D illustrating the distortion aberration indicates that the distortion aberration is maintained within a range from 0 to 2.5%, indicating that the distortion aberration of the optical imaging lens of the first embodiment already satisfies the imaging quality requirement of an optical system.

Based on the above, compared with known optical lenses, the optical imaging lens 10 of the first embodiment is able to render a desirable imaging quality under a condition that the system length is reduced to about 5.502 mm. Besides, in the optical imaging lens of the first embodiment, the system length is reduced and the shooting angle is expanded under a condition of maintaining a desirable optical performance. Thus, a product design capable of miniaturization and expanding the field of view is achieved.

FIG. 10 is a schematic diagram illustrating an optical imaging lens according to a second embodiment of the invention. FIGS. 11A to 11D are diagrams illustrating a longitudinal spherical aberration and various aberrations of the optical imaging lens according to the second embodiment. Referring to FIG. 10, the second embodiment of the optical imaging lens 10 is similar to the first embodiment, and the differences therebetween mainly include the following: respective optical data, aspheric coefficients and parameters among the lens elements are different to a more or lesser extent. In addition, an optical axis region 267 of the image-side surface 26 of the second lens element 2 is convex. To clearly illustrate the drawing, some reference numerals indicating surface shapes same as those of the first embodiment are omitted in FIG. 10.

Detailed optical data of the optical imaging lens 10 are as shown in FIG. 12. In addition, the EFL of the whole optical imaging lens 10 of the second embodiment is 4.275 mm, the HFOV thereof is 36.830, the Fno thereof is 1.6, the TTL thereof is 5.686 mm, and the image height thereof is 3.238 mm.

Respective aspheric coefficients of the object-side surfaces and the image-side surfaces of the eight lens elements of the second embodiment in Equation (1) are shown in FIG. 13.

In addition, relations of important parameters in the optical imaging lens 10 according to the second embodiment are as shown in FIGS. 34 and 35.

Referring to FIGS. 11A to 11D, in FIG. 11A illustrating the longitudinal spherical aberration, imaging point deviations of the off-axis rays in different heights are controlled within −0.025 mm to 0.015 mm when the pupil radius is 1.3358 mm. In FIGS. 11B and 11C illustrating the field curvature aberrations, focal length variations of the three representing wavelengths in the whole field range fall within a range from −0.07 mm to 0.01 mm. In FIG. 11D illustrating the distortion aberration, the distortion aberration is maintained within a range from −0.2% to 1.25%. Based on the above, compared with known optical lenses, the optical imaging lens 10 of the second embodiment is able to render a desirable imaging quality under a condition that the system length is reduced to about 5.686 mm.

In addition, based on the above, the second embodiment is more desirable over the first embodiment in that the distortion aberration of the second embodiment is less than that of the first embodiment.

FIG. 14 is a schematic diagram illustrating an optical imaging lens according to a third embodiment of the invention. FIGS. 15A to 15D are diagrams illustrating a longitudinal spherical aberration and various aberrations of the optical imaging lens according to the third embodiment. Referring to FIG. 14, the third embodiment of the optical imaging lens 10 is similar to the first embodiment, and the differences therebetween mainly include the following: respective optical data, aspheric coefficients and parameters among the lens elements are different to a more or lesser extent. In addition, an optical axis region 267 of the image-side surface 26 of the second lens element 2 is convex. To clearly illustrate the drawing, some reference numerals indicating surface shapes same as those of the first embodiment are omitted in FIG. 14.

Detailed optical data of the optical imaging lens 10 are as shown in FIG. 16. In addition, the EFL of the whole optical imaging lens 10 of the third embodiment is 4.325 mm, the HFOV thereof is 36.904°, the Fno thereof is 1.6, the TTL thereof is 5.816 mm, and the image height thereof is 3.238 mm.

Respective aspheric coefficients of the object-side surfaces and the image-side surfaces of the eight lens elements of the third embodiment in Equation (1) are shown in FIG. 17.

In addition, relations of important parameters in the optical imaging lens 10 according to the third embodiment are as shown in FIGS. 34 and 35.

Referring to FIGS. 15A to 15D, in FIG. 15A illustrating the longitudinal spherical aberration, imaging point deviations of the off-axis rays in different heights are controlled within −0.019 mm to 0.02 mm when the pupil radius is 1.3515 mm. In FIGS. 15B and 15C illustrating the field curvature aberrations, focal length variations of the three representing wavelengths in the whole field range fall within a range from −0.05 mm to 0.035 mm. In FIG. 15D illustrating the distortion aberration, the distortion aberration is maintained within a range from −1% to 0.6%. Based on the above, compared with known optical lenses, the optical imaging lens 10 of the third embodiment is able to render a desirable imaging quality under a condition that the system length is reduced to about 5.816 mm.

In addition, based on the above, the third embodiment is more desirable over the first embodiment in that the distortion aberration of the third embodiment is less than that of the first embodiment.

FIG. 18 is a schematic diagram illustrating an optical imaging lens according to a fourth embodiment of the invention. FIGS. 19A to 19D are diagrams illustrating a longitudinal spherical aberration and various aberrations of the optical imaging lens according to the fourth embodiment. Referring to FIG. 18, the fourth embodiment of the optical imaging lens 10 is similar to the first embodiment, and the differences therebetween mainly include the following: respective optical data, aspheric coefficients and parameters among the lens elements are different to a more or lesser extent. In addition, a periphery region 368 of the image-side surface 36 of the third lens element 3 and a periphery region 568 of the image-side surface 56 of the fifth lens element 5 are concave. To clearly illustrate the drawing, some reference numerals indicating surface shapes same as those of the first embodiment are omitted in FIG. 18.

Detailed optical data of the optical imaging lens 10 are as shown in FIG. 20. In addition, the EFL of the whole optical imaging lens 10 of the fourth embodiment is 3.639 mm, the HFOV thereof is 37.332°, the Fno thereof is 1.6, the TTL thereof is 4.695 mm, and the image height thereof is 3.238 mm.

Respective aspheric coefficients of the object-side surfaces and the image-side surfaces of the eight lens elements of the fourth embodiment in Equation (1) are shown in FIG. 21.

In addition, relations of important parameters in the optical imaging lens 10 according to the fourth embodiment are as shown in FIGS. 34 and 35.

Referring to FIGS. 19A to 19D, in FIG. 19A illustrating the longitudinal spherical aberration, imaging point deviations of the off-axis rays in different heights are controlled within −0.06 mm to 0.05 mm when the pupil radius is 1.1372 mm. In FIGS. 19B and 19C illustrating the field curvature aberrations, focal length variations of the three representing wavelengths in the whole field range fall within a range from −0.25 mm to 0.05 mm. In FIG. 19D illustrating the distortion aberration, the distortion aberration is maintained within a range from 0% to 15%. Based on the above, compared with known optical lenses, the optical imaging lens 10 of the fourth embodiment is able to render a desirable imaging quality under a condition that the system length is reduced to about 4.695 mm.

In addition, based on the above, the fourth embodiment is more desirable over the first embodiment in that the system length of the optical imaging lens 10 of the fourth embodiment is shorter than that of the first embodiment, and the HFOV of the fourth embodiment is greater than that of the first embodiment.

FIG. 22 is a schematic diagram illustrating an optical imaging lens according to a fifth embodiment of the invention. FIGS. 23A to 23D are diagrams illustrating a longitudinal spherical aberration and various aberrations of the optical imaging lens according to the fifth embodiment. Referring to FIG. 22, the fifth embodiment of the optical imaging lens 10 is similar to the first embodiment, and the differences therebetween mainly include the following: respective optical data, aspheric coefficients and parameters among the lens elements are different to a more or lesser extent. In addition, an optical axis region 267 of the image-side surface 26 of the second lens element 2 and a periphery region 858 of the object-side surface 85 of the eighth lens element 8 are convex. To clearly illustrate the drawing, some reference numerals indicating surface shapes same as those of the first embodiment are omitted in FIG. 22.

Detailed optical data of the optical imaging lens 10 are as shown in FIG. 24. In addition, the EFL of the whole optical imaging lens 10 of the fifth embodiment is 4.144 mm, the HFOV thereof is 37.116°, the Fno thereof is 1.6, the TTL thereof is 5.577 mm, and the image height thereof is 3.238 mm.

Respective aspheric coefficients of the object-side surfaces and the image-side surfaces of the eight lens elements of the fifth embodiment in Equation (1) are shown in FIG. 25.

In addition, relations of important parameters in the optical imaging lens 10 according to the fifth embodiment are as shown in FIGS. 34 and 35.

Referring to FIGS. 23A to 23D, in FIG. 23A illustrating the longitudinal spherical aberration, imaging point deviations of the off-axis rays in different heights are controlled within −0.025 mm to 0.02 mm when the pupil radius is 1.2949 mm. In FIGS. 23B and 23C illustrating the field curvature aberrations, focal length variations of the three representing wavelengths in the whole field range fall within a range from −0.07 mm to 0.09 mm. In FIG. 23D illustrating the distortion aberration, the distortion aberration is maintained within a range from −0.5% to 2.5%. Based on the above, compared with known optical lenses, the optical imaging lens 10 of the fifth embodiment is able to render a desirable imaging quality under a condition that the system length is reduced to about 5.577 mm.

In addition, based on the above, the fifth embodiment is more desirable over the first embodiment in that the HFOV of the fifth embodiment is greater than that of the first embodiment.

FIG. 26 is a schematic diagram illustrating an optical imaging lens according to a sixth embodiment of the invention. FIGS. 27A to 27D are diagrams illustrating a longitudinal spherical aberration and various aberrations of the optical imaging lens according to the sixth embodiment. Referring to FIG. 26, the sixth embodiment of the optical imaging lens 10 is similar to the first embodiment, and the differences therebetween mainly include the following: respective optical data, aspheric coefficients and parameters among the lens elements are different to a more or lesser extent. In addition, a periphery region 568 of the image-side surface 56 of the fifth lens element 5 is concave. To clearly illustrate the drawing, some reference numerals indicating surface shapes same as those of the first embodiment are omitted in FIG. 26.

Detailed optical data of the optical imaging lens 10 are as shown in FIG. 28. In addition, the EFL of the whole optical imaging lens 10 of the sixth embodiment is 3.989 mm, the HFOV thereof is 37.193°, the Fno thereof is 1.6, the TTL thereof is 5.281 mm, and the image height thereof is 3.238 mm.

Respective aspheric coefficients of the object-side surfaces and the image-side surfaces of the eight lens elements of the sixth embodiment in Equation (1) are shown in FIG. 29.

In addition, relations of important parameters in the optical imaging lens 10 according to the sixth embodiment are as shown in FIGS. 34 and 35.

Referring to FIGS. 27A to 27D, in FIG. 27A illustrating the longitudinal spherical aberration, imaging point deviations of the off-axis rays in different heights are controlled within −0.065 mm to 0.026 mm when the pupil radius is 1.2464 mm. In FIGS. 27B and 27C illustrating the field curvature aberrations, focal length variations of the three representing wavelengths in the whole field range fall within a range from −0.16 mm to −0.025 mm. In FIG. 27D illustrating the distortion aberration, the distortion aberration is maintained within a range from 0% to 5%. Based on the above, compared with known optical lenses, the optical imaging lens 10 of the sixth embodiment is able to render a desirable imaging quality under a condition that the system length is reduced to about 5.281 mm.

In addition, based on the above, the sixth embodiment is more desirable over the first embodiment in that the system length of the optical imaging lens 10 of the sixth embodiment is shorter than that of the first embodiment, and the HFOV of the sixth embodiment is greater than that of the first embodiment.

FIG. 30 is a schematic diagram illustrating an optical imaging lens according to a seventh embodiment of the invention. FIGS. 31A to 31D are diagrams illustrating a longitudinal spherical aberration and various aberrations of the optical imaging lens according to the seventh embodiment. Referring to FIG. 30, the seventh embodiment of the optical imaging lens 10 is similar to the first embodiment, and the differences therebetween mainly include the following: respective optical data, aspheric coefficients and parameters among the lens elements are different to a more or lesser extent. In addition, a periphery region 258 of the object-side surface 25 of the second lens element 2, an optical axis region 457 of the object-side surface 45 of the fourth lens element 4, and a periphery region 668 of the image-side surface 66 of the sixth lens element 6 are concave, and a periphery region 858 of the object-side surface 85 of the eighth lens element 8 is convex. To clearly illustrate the drawing, some reference numerals indicating surface shapes same as those of the first embodiment are omitted in FIG. 30.

Detailed optical data of the optical imaging lens 10 are as shown in FIG. 32. In addition, the EFL of the whole optical imaging lens 10 of the seventh embodiment is 3.893 mm, the HFOV thereof is 37.121', the Fno thereof is 1.6, the TTL thereof is 5.211 mm, and the image height thereof is 3.238 mm.

Respective aspheric coefficients of the object-side surfaces and the image-side surfaces of the eight lens elements of the seventh embodiment in Equation (1) are shown in FIG. 33.

In addition, relations of important parameters in the optical imaging lens 10 according to the seventh embodiment are as shown in FIGS. 34 and 35.

Referring to FIGS. 31A to 31D, in FIG. 31A illustrating the longitudinal spherical aberration, imaging point deviations of the off-axis rays in different heights are controlled within −0.25 mm to 0.05 mm when the pupil radius is 1.2167 mm. In FIGS. 31B and 31C illustrating the field curvature aberrations, focal length variations of the three representing wavelengths in the whole field range fall within a range from −0.25 mm to 0.35 mm. In FIG. 31D illustrating the distortion aberration, the distortion aberration is maintained within a range from 0% to 2.5%. Based on the above, compared with known optical lenses, the optical imaging lens 10 of the seventh embodiment is able to render a desirable imaging quality under a condition that the system length is reduced to about 5.211 mm.

In addition, based on the above, the seventh embodiment is more desirable over the first embodiment in that the system length of the optical imaging lens 10 of the seventh embodiment is shorter than that of the first embodiment, the HFOV of the seventh embodiment is greater than that of the first embodiment, and the distortion aberration of the seventh embodiment is less than that of the first embodiment.

In the respective embodiments of the invention, the optical imaging lens exhibits a small Fno and renders a desirable imaging quality. Besides, the spherical aberration and the image aberration of the optical system may be corrected and the distortion aberration thereof may be reduced through the design of concave/convex surface shapes of the lens elements. For example, the optical axis region of the image-side surface of the third lens element is concave, the optical axis region of the object-side surface of the fifth lens element is concave, the periphery region of the image-side surface of the fifth lens element is convex, the optical axis region of the object-side surface of the sixth lens element is convex, and the optical axis region of the object-side surface of the seventh lens element is convex. In addition, the design that the first lens element and the second lens element both have positive refracting power may facilitate convergence of rays, so as to reduce the system length of the optical imaging lens. Moreover, to reduce the system length and ensure the imaging quality, the air gap between lens elements or the thickness of the lens element may be reduced. Nevertheless, considering the manufacturing complexity, a configuration according to the embodiments of the invention is desirable if at least one of the following conditions is satisfied.

ALT/(T4+G45)≤4.800, a preferable range is 3.000≤ALT/(T4+G45)≤4.800;

(G34+G78)/T3≤3.500, a preferable range is 1.700≤(G34+G78)/T3≤3.500;

AAG/(G12+G23+G67)≤5.000, a preferable range is 1.700≤AAG/(G12+G23+G67)≤5.000;

TL/BFL≥3.500, a preferable range is 3.500 TL/BFL≤5.100;

(T6+T7+T8)/(G12+G45+G67)≤3.500, a preferable range is 1.000≤(T6+T7+T8)/(G12+G45+G67)≤3.500;

(T1+T2+T4)/(T5+T6)≥2.000, a preferable range is 2.000≤(T1+T2+T4)/(T5+T6)≤3.200;

(G45+T5+G56)/T6≥1.800, a preferable range is 1.800≤(G45+T5+G56)/T6≤2.600;

AAG/(G45+T5+G67)≤2.200, a preferable range is 1.200≤AAG/(G45+T5+G67)≤2.200;

(T4+G45+T5)/(G56+T6)≥2.000, a preferable range is 2.000≤(T4+G45+T5)/(G56+T6)≤4.500;

(T1+T2+T3)/(G23+G34)≥2.700, a preferable range is 2.700≤(T1+T2+T3)/(G23+G34)≤4.000;

AAG/(G23+G45)≤5.500, a preferable range is 2.800≤AAG/(G23+G45)≤5.500;

ALT/(T3+T4)≤4.300, a preferable range is 3.000≤ALT/(T3+T4)≤4.300;

(G78+T8)/G67≤6.500, a preferable range is 1.000≤(G78+T8)/G67≤6.500;

(T4+T6)/G45≤6.000, a preferable range is 2.200≤(T4+T6)/G45≤6.000;

(G34+G45)/G78≥1.500, a preferable range is 1.500≤(G34+G45)/G78≤2.300;

(T5+T6)/T3≤3.100, a preferable range is 2.100≤(T5+T6)/T3≤3.100;
EFL/(G45+T5)≤8.500, a preferable range is 5.600≤EFL/(G45+T5)≤8.500; and
T6/(G12+G45)≤1.600, a preferable range is 0.400≤T6/(G12+G45)≤1.600.

Considering the unpredictability in the design of optical system, under the framework of the embodiments of the invention, the embodiments of the invention may have a shorter system length, a greater field of view, a desirable imaging quality, or a facilitated assembling yield rate if the above conditions are satisfied.

In view of the foregoing, the optical imaging lens according to one or some exemplary embodiments of the invention is able to render one or some of the following:

i. The longitudinal spherical aberrations, field curvature aberrations, and distortion aberrations of the respective embodiments of the invention meet the protocol of use. In addition, the off-axis rays of the three representing wavelengths, i.e., 650 nm, 555 nm, and 470 nm, in different heights are all concentrated at a vicinity of the imaging point. The extents of deviation of the respective curves show that the imaging point deviations of the off-axis rays in different heights are controlled, so a desirable suppressing ability against spherical aberration, image aberration, and distortion aberration is rendered. The imaging quality data further suggest that the distances among the three representing wavelengths, i.e., 650 nm, 555 nm, and 470 nm, are close to each other, indicating that the embodiments of the invention are able to desirably concentrate rays of different wavelengths in various states and exhibit an excellent dispersion suppressing ability. Therefore, the embodiments of the invention render a desirable optical performance.

ii. An arbitrary number of the exemplary limiting relations listed above may also be arbitrarily and optionally combined and incorporated into the embodiments of the invention. The invention shall not be construed as being limited thereto.

iii. The maximum and minimum numeral values derived from the combinations of the optical parameters disclosed in the embodiments of the invention may all be applicable and enable people skill in the pertinent art to implement the invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An optical imaging lens, comprising a first lens element, a second lens element, a third lens element, a fourth lens element, a fifth lens element, a sixth lens element, a seventh lens element, and an eighth lens element sequentially arranged along an optical axis from an object side to an image side, each of the first lens element to the eighth lens element comprising an object-side surface facing toward the object side and allowing imaging rays to pass through and an image-side surface facing toward the image side and allowing the imaging rays to pass through, wherein:
the first lens element has positive refracting power;
the second lens element has positive refracting power;
the third lens element has negative refracting power;
the fifth lens element has positive refracting power;
an optical axis region of the object-side surface of the sixth lens element is convex;
the seventh lens element has positive refracting power, and an optical axis region of the object-side surface of the seventh lens element is convex; and
the lens elements of the optical imaging lens are only the eight lens elements describe above;
wherein the optical imaging lens satisfies: EFL/(G45+T5)≤8.500, wherein EFL is an effective focal length of the optical imaging lens, G45 is an air gap from the fourth lens element to the fifth lens element along the optical axis, and T5 is a thickness of the fifth lens element along the optical axis.

2. The optical imaging lens as claimed in claim 1, wherein the optical imaging lens satisfies: (T4+T6)/G45≤6.000, wherein T4 is a thickness of the fourth lens element along the optical axis, and T6 is a thickness of the sixth lens element along the optical axis.

3. The optical imaging lens as claimed in claim 1, wherein the optical imaging lens satisfies: AAG/(G12+G23+G67)≤5.000, wherein AAG is a sum of seven air gaps from the first lens element to the eighth lens element along the optical axis, G12 is an air gap from the first lens element to the second lens element along the optical axis, G23 is an air gap from the second lens element to the third lens element along the optical axis, and G67 is an air gap from the sixth lens element to the seventh lens element along the optical axis.

4. The optical imaging lens as claimed in claim 1, wherein the optical imaging lens satisfies: (T5+T6)/T3≤3.100, wherein T3 is a thickness of the third lens element along the optical axis, and T6 is a thickness of the sixth lens element along the optical axis.

5. The optical imaging lens as claimed in claim 1, wherein the optical imaging lens satisfies: AAG/(G45+T5+G67)≤2.200, wherein AAG is a sum of seven air gaps from the first lens element to the eighth lens element along the optical axis, and G67 is an air gap from the sixth lens element to the seventh lens element along the optical axis.

6. The optical imaging lens as claimed in claim 1, wherein the optical imaging lens satisfies: ALT/(T4+G45)≤4.800, wherein ALT is a sum of thicknesses of the first lens element, the second lens element, the third lens element, the fourth lens element, the fifth lens element, the sixth lens element, the seventh lens element, and the eighth lens element along the optical axis, and T4 is a thickness of the fourth lens element along the optical axis.

7. The optical imaging lens as claimed in claim 1, wherein the optical imaging lens satisfies: (T4+G45+T5)/(G56+T6)≥2.000, wherein T4 is a thickness of the fourth lens element along the optical axis, T6 is a thickness of the sixth lens element along the optical axis, and G56 is an air gap from the fifth lens element to the sixth lens element along the optical axis.

8. An optical imaging lens, comprising a first lens element, a second lens element, a third lens element, a fourth lens element, a fifth lens element, a sixth lens element, a seventh lens element, and an eighth lens element sequentially arranged along an optical axis from an object side to an image side, each of the first lens element to the eighth lens element comprising an object-side surface facing toward the object side and allowing imaging rays to pass through and an image-side surface facing toward the image side and allowing the imaging rays to pass through, wherein:
a periphery region of the image-side surface of the first lens element is concave;
an optical axis region of the image-side surface of the second lens element is concave;
the sixth lens element has negative refracting power;

an optical axis region of the image-side surface of the seventh lens element is concave;

the eighth lens element has negative refracting power, and a periphery region of the object-side surface of the eighth lens element is concave; and the lens elements of the optical imaging lens are only the eight lens elements describe above;

wherein the optical imaging lens satisfies: EFL/(G45+T5) ≤8.500 and (T4+T6)/G45≤6.000, wherein EFL is an effective focal length of the optical imaging lens, G45 is an air gap from the fourth lens element to the fifth lens element along the optical axis, T4 is a thickness of the fourth lens element along the optical axis, T5 is a thickness of the fifth lens element along the optical axis, and T6 is a thickness of the sixth lens element along the optical axis, wherein when a surface of the lens element has at least one transition point, a region of the surface from a central point to a nearest transition point is defined as the optical axis region, and a region located radially outside of a farthest transition point from the optical axis to an optical boundary of the surface is defined as the periphery region, where a tangent to the at least one transition point is perpendicular to the optical axis, the central point is a point of intersection of the surface and the optical axis, and the optical boundary is defined as a point at which a radially outermost marginal ray passing through the surface intersects the surface of the lens element, wherein when the surface of the lens element has no transition point, the optical axis region is defined as a region of 0%-50% of a distance between the optical axis and the optical boundary of the surface, and the periphery region is defined as a region of 50%-100% of the distance between the optical axis and the optical boundary of the surface.

9. The optical imaging lens as claimed in claim 8, wherein the optical imaging lens satisfies: (G34+G78)/T3≤3.500, wherein G34 is an air gap from the third lens element to the fourth lens element along the optical axis, G78 is an air gap from the seventh lens element to the eighth lens element along the optical axis, and T3 is a thickness of the third lens element along the optical axis.

10. The optical imaging lens as claimed in claim 8, wherein the optical imaging lens satisfies: TL/BFL≥3.500, wherein TL is a distance from the object-side surface of the first lens element to the image-side surface of the eighth lens element along the optical axis, and BFL is a distance from the image-side surface of the eighth lens element to an image plane along the optical axis.

11. The optical imaging lens as claimed in claim 8, wherein the optical imaging lens satisfies: (T1+T2+T4)/(T5+T6)≥2.000, wherein T1 is a thickness of the first lens element along the optical axis, and T2 is a thickness of the second lens element along the optical axis.

12. The optical imaging lens as claimed in claim 8, wherein the optical imaging lens satisfies: AAG/(G23+G45) ≤5.500, wherein AAG is a sum of seven air gaps from the first lens element to the eighth lens element along the optical axis, and G23 is an air gap from the second lens element to the third lens element along the optical axis.

13. The optical imaging lens as claimed in claim 8, wherein the optical imaging lens satisfies: (G78+T8)/G67≤6.500, wherein T8 is a thickness of the eighth lens element along the optical axis, G67 is an air gap from the sixth lens element to the seventh lens element along the optical axis, and G78 is an air gap from the seventh lens element to the eighth lens element along the optical axis.

14. The optical imaging lens as claimed in claim 8, wherein the optical imaging lens satisfies: (G45+T5+G56)/T6≥1.800, wherein G56 is an air gap from the fifth lens element to the sixth lens element along the optical axis.

15. An optical imaging lens, comprising a first lens element, a second lens element, a third lens element, a fourth lens element, a fifth lens element, a sixth lens element, a seventh lens element, and an eighth lens element sequentially arranged along an optical axis from an object side to an image side, each of the first lens element to the eighth lens element comprising an object-side surface facing toward the object side and allowing imaging rays to pass through and an image-side surface facing toward the image side and allowing the imaging rays to pass through, wherein:

the first lens element has positive refracting power;

an optical axis region of the image-side surface of the sixth lens element is concave;

an optical axis region of the image-side surface of the seventh lens element is concave; and the lens elements of the optical imaging lens are only the eight lens elements describe above;

wherein the optical imaging lens satisfies: (T1+T2+T4)/(T5+T6)≥2.000 and EFL/(G45+T5)≤8.500, wherein T1 is a thickness of the first lens element along the optical axis, T2 is a thickness of the second lens element along the optical axis, T4 is a thickness of the fourth lens element along the optical axis, T5 is a thickness of the fifth lens element along the optical axis, T6 is a thickness of the sixth lens element along the optical axis, EFL is an effective focal length of the optical imaging lens, and G45 is an air gap from the fourth lens element to the fifth lens element along the optical axis.

16. The optical imaging lens as claimed in claim 15, wherein the optical imaging lens satisfies: (T1+T2+T3)/(G23+G34)≥2.700, wherein T3 is a thickness of the third lens element along the optical axis, G23 is an air gap from the second lens element to the third lens element along the optical axis, G34 is an air gap from the third lens element to the fourth lens element along the optical axis.

17. The optical imaging lens as claimed in claim 15, wherein the optical imaging lens satisfies: (T6+T7+T8)/(G12+G45+G67)≤3.500, wherein T7 is a thickness of the seventh lens element along the optical axis, T8 is a thickness of the eighth lens element along the optical axis, G12 is an air gap from the first lens element to the second lens element along the optical axis, and G67 is an air gap from the sixth lens element to the seventh lens element along the optical axis.

18. The optical imaging lens as claimed in claim 15, wherein the optical imaging lens satisfies: (G34+G45)/G78≥1.500, wherein G34 is an air gap from the third lens element to the fourth lens element along the optical axis, and G78 is an air gap from the seventh lens element to the eighth lens element along the optical axis.

19. The optical imaging lens as claimed in claim 15, wherein the optical imaging lens satisfies: T6/(G12+G45) ≤1.600, wherein G12 is an air gap from the first lens element to the second lens element along the optical axis.

20. The optical imaging lens as claimed in claim 15, wherein the optical imaging lens satisfies: ALT/(T3+T4) ≤4.300, wherein ALT is a sum of thicknesses of the first lens element, the second lens element, the third lens element, the fourth lens element, the fifth lens element, the sixth lens element, the seventh lens element, and the eighth lens element along the optical axis, and T3 is a thickness of the third lens element along the optical axis.

* * * * *